(12) United States Patent
Wei

(10) Patent No.: US 12,547,212 B2
(45) Date of Patent: Feb. 10, 2026

(54) DISPLAY DEVICE

(71) Applicant: BOE Technology Group Co., Ltd., Beijing (CN)

(72) Inventor: Yuehan Wei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 98 days.

(21) Appl. No.: 18/280,472

(22) PCT Filed: Oct. 31, 2022

(86) PCT No.: PCT/CN2022/128742
§ 371 (c)(1),
(2) Date: Sep. 6, 2023

(87) PCT Pub. No.: WO2024/092441
PCT Pub. Date: May 10, 2024

(65) Prior Publication Data
US 2025/0021131 A1    Jan. 16, 2025

(51) Int. Cl.
*G06F 1/16* (2006.01)
(52) U.S. Cl.
CPC .......... *G06F 1/1652* (2013.01); *G06F 1/1624* (2013.01); *G06F 1/1656* (2013.01)
(58) Field of Classification Search
CPC ..... G06F 1/1652; G06F 1/1624; G06F 1/1656
See application file for complete search history.

(56) References Cited

U.S. PATENT DOCUMENTS

| | | |
|---|---|---|
| 10,963,014 B1 | 3/2021 | Park et al. |
| 11,012,546 B1 | 5/2021 | Song et al. |
| 11,497,130 B2 * | 11/2022 | Song ............... G06F 1/1652 |
| 2011/0181811 A1 | 7/2011 | Touwslager et al. |
| 2013/0058063 A1 | 3/2013 | O'Brien |
| 2017/0318688 A1 | 11/2017 | Kim et al. |
| 2021/0294389 A1 | 9/2021 | Ou et al. |
| 2022/0011821 A1 * | 1/2022 | Han ............... G06F 1/1624 |
| 2022/0155823 A1 | 5/2022 | Shin et al. |

(Continued)

FOREIGN PATENT DOCUMENTS

| | | |
|---|---|---|
| CN | 102902308 A | 1/2013 |
| CN | 106097896 A | 11/2016 |

(Continued)

*Primary Examiner* — Allen L Parker
*Assistant Examiner* — Elisa Sasserath
(74) *Attorney, Agent, or Firm* — XSENSUS LLP

(57) ABSTRACT

Provided is a display device. The display device includes: a first housing and at least one second housing, wherein the second housing is slidably connected to the first housing; a flexible display panel including a planar display portion and a rollable display portion, wherein the planar display portion is secured on the first housing; a reel disposed in and connected to the second housing, wherein the rollable display portion includes a first portion wound over the reel and a second portion parallel to the planar display portion; and a plurality of support columns arranged in an array, wherein two ends of each support column are slidably connected to the second housing, the support columns are fixedly connected to a rear face of the rollable display portion, and at least some support columns are in contact with a side of the reel.

18 Claims, 18 Drawing Sheets

(56) References Cited

U.S. PATENT DOCUMENTS

2022/0322551 A1* 10/2022 Cheng .................. H05K 5/0217
2022/0342448 A1* 10/2022 Shin ...................... G06F 1/1624
2024/0040717 A1    2/2024 Zhang et al.

FOREIGN PATENT DOCUMENTS

| CN | 107342018 A | 11/2017 |
| CN | 111816064 A | 10/2020 |
| CN | 112435579 A | 3/2021 |
| CN | 113395845 A | 9/2021 |
| CN | 113808490 A | 12/2021 |
| CN | 113940048 A | 1/2022 |
| CN | 114170911 A | 3/2022 |
| CN | 114694491 A | 7/2022 |
| EP | 3893472 B1 | 11/2022 |

* cited by examiner

DISPLAY DEVICE

CROSS-REFERENCE TO RELATED APPLICATION

This application is a U.S. national stage of international application No. PCT/CN2022/128742, filed on Oct. 31, 2022, the disclosure of which is incorporated herein by reference in its entirety.

TECHNICAL FIELD

The present disclosure relates to the field of display technologies, and in particular, relates to a display device.

BACKGROUND

At present, a display device generally employs a flexible display panel as a display screen thereof. The flexible display panel has advantages of deformability, bendability, and great flexibility over the traditional display panel.

SUMMARY

Embodiments of the present disclosure provide a display device. The technical solutions are as follows.

In some embodiments of the present disclosure, a display device is provided. The display device includes:
- a first housing and at least one second housing, wherein the at least one second housing is slidably connected to the first housing;
- a flexible display panel, including a planar display portion and a rollable display portion, wherein the planar display portion is secured on the first housing;
- a reel disposed in the at least one second housing and connected to the at least one second housing, wherein the rollable display portion includes a first portion wound over the reel and a second portion parallel to the planar display portion; and
- a plurality of support columns arranged in an array, wherein two ends of each of the plurality of support columns are slidably connected to the at least one second housing, the plurality of support columns are fixedly connected to a rear face of the rollable display portion, and at least some of the plurality of support columns are in contact with a side, facing away from the first housing, of the reel in a slide direction of the at least one second housing relative to the first housing.

In some embodiments, in sliding of the at least one second housing relative to the first housing, at least one of the plurality of support columns is in contact with the side, facing away from the first housing, of the reel in the slide direction of the at least one second housing relative to the first housing.

In some embodiments, the plurality of support columns are equally spaced apart on the rear face of the rollable display portion.

In some embodiments, the two ends of the each of the plurality of support columns are provided with first slide protrusions, and the at least one second housing includes a support housing and two limit members respectively and fixedly connected to two ends of the support housing, wherein the plurality of support columns are disposed between the two limit members, a slideway is defined in sides, facing towards the plurality of support columns, of the two limit members, and at least part of the first slide protrusions are disposed in the slideway.

In some embodiments, the slideway includes a first planar slideway and a second planar slideway that are opposite, and a curved slideway in communication with both the first planar slideway and the second planar slideway, wherein the curved slideway is disposed on the side, facing away from the first housing, of the reel.

In some embodiments, the two ends of the each of the plurality of support columns are further provided with first limit protrusions adjacent to the first slide protrusions, wherein the first limit protrusions are outside the slideway, and a portion, connected to the support column, of the rollable display portion is disposed between two of the first limit protrusions in each of the plurality of support columns.

In some embodiments, the first limit protrusions are provided with protrusion portions and recess portions that are opposite, wherein in two adjacent first limit protrusions, at least part of the protrusion portion of one of the two adjacent first limit protrusions is in the recess portion of the other of the two adjacent first limit protrusions.

In some embodiments, the flexible display panel further includes a non-display portion on a side, facing away from the planar display portion, of the rollable display portion, and the display device further includes a support plate, wherein the support plate is fixedly connected to a rear face of the non-display portion, and two ends of the support plate are slidably connected to the slideway.

In some embodiments, the two ends of the support plate are both provided with second slide protrusions and second limit protrusions, wherein at least part of the second slide protrusions are in the slideway, the second limit protrusions are outside the slideway, and a portion, connected to the support plate, of the non-display portion is disposed between two of the second limit protrusions in the support plate.

In some embodiments, faces, facing away from the plurality of support columns, of the first limit protrusions are flush with faces, facing away from the support plate, of the second limit protrusions.

In some embodiments, the display device further includes: a drive assembly connected to the first housing and the at least one second housing, wherein the drive assembly is configured to drive the at least one second housing to slide relative to the first housing.

In some embodiments, the drive assembly includes a drive motor, a screw, and a first slide block, wherein the drive motor is secured on the first housing and connected to an end of the screw, and the first slide block is sleeved on the screw, connected to the at least one second housing, and
  configured to move in a lengthwise direction of the screw in rotation of the screw driven by the drive motor to drive the at least one second housing to slide relative to the first housing.

In some embodiments, in the case that the display device includes a support plate, the at least one second housing includes a strip-shaped first drive slideway, and a second drive slideway is defined in a side, proximal to the at least one second housing, of the support plate, wherein a lengthwise direction of the first drive slideway and a lengthwise direction of the second drive slideway both are both perpendicular to an axial direction of reel;
  an end, proximal to the reel, of the first drive slideway is a first baffle end, and an end, facing away from the reel, of the second drive slideway is a second baffle end; and
  the first slide block is provided with a rod extending in the first drive slideway and the second drive slideway, wherein the rod is configured to drive the at least one second housing to slide in a direction facing away from the first housing upon contact with the first baffle end, and drive the at least one second housing to slide in a direction approaching the first housing through the support plate upon contact with the second baffle end.

In some embodiments, a first opening is defined in an end, facing away from the reel, of the first drive slideway, and a second opening is defined in an end, close to the reel, of the second drive slideway.

In some embodiments, the display device further includes: a fixed guide rail and a second slide block, wherein the fixed guide rail is secured on the first housing, a lengthwise direction of the guide rail is parallel to the slide direction of the at least one second housing relative to the first housing, and the second slide block is secured on the at least one second housing, sleeved on the fixed guide rail and slidably connected to the fixed guide rail.

In some embodiments, the at least one second housing is provided with a plurality of guide bars arranged in parallel, wherein a lengthwise direction of the plurality of guide bars is perpendicular to an axial direction of the reel; and the first housing is provided with a plurality of guide slideways in one-to-one correspondence to the plurality of guide bars, wherein at least part of the plurality of guide bars are in the corresponding guide slideways and slidably connected to the corresponding guide slideways.

In some embodiments, the plurality of guide slideways are dovetail slots, and the plurality of guide bars include guide bar bodies and guide slide blocks fixedly connected to end portions of the guide bar bodies, wherein shapes of the guide slide blocks are matched with shapes of the dovetail slots, and at least part of the guide slide blocks are in the dovetail slots.

In some embodiments, the first housing is further provided with a plurality of guide protrusions, wherein an arrangement direction of the plurality of guide protrusions is parallel to an arrangement direction of the plurality of guide bars, any two adjacent guide protrusions are configured to define one guide slideway, any of the guide bar bodies is disposed between two adjacent guide protrusions, and a face, proximal to the planar display portion, of the any of the guide bar bodies is flush with faces, proximal to the planar display portion, of the two adjacent guide protrusions.

In some embodiments, the reel includes a reel core and at least two reel housings, wherein the reel core is fixedly connected to the at least one second housing, and the at least two reel housings are sleeved on the reel core, rotatably connected to the reel core and arranged in an axial direction of the reel core.

In some embodiments, one second housing is defined in the display device, wherein the second housing is disposed on any of two opposite sides of the first housing upon unrolling of the flexible display panel; or two second housings are defined in the display device, wherein the two second housings are respectively disposed on two opposite sides of the first housing upon unrolling of the flexible display panel.

BRIEF DESCRIPTION OF DRAWINGS

For clearer description of the technical solutions in the embodiments of the present disclosure, the following briefly describes the accompanying drawings required for describing the embodiments. Apparently, the accompanying drawings in the following description show merely some embodiments of the present disclosure, and those of ordinary skill in the art may still derive other drawings from these accompanying drawings without any creative efforts.

Clear embodiments of the present disclosure are shown by the above accompanying drawings, and more detailed descriptions are shown hereinafter. The accompanying drawings and texts are not intended to limit the scope of the scope of the concept of the present disclosure in any way, but to describe the concept of the present disclosure for those skilled in the art with reference to specific embodiments.

DETAILED DESCRIPTION

To make the objectives, technical solutions, and advantages of the present disclosure clearer, the embodiments of the present disclosure are further described in detail hereinafter with reference to the accompanying drawings.

The display device generally includes a reel and a flexible display panel. The reel itself can rotate, and the flexible display panel can be unrolled and rolled with the reel, such that the display device has an unrolling state and a rolling state. Thus, dimensions of a display face of the display device can be adjusted.

However, upon unrolling of the flexible display panel in the above display device, partial regions of the display panel are uneven due to an inner-stress of the display panel. Consequently, the display effect of the display device is poor.

Figure 1:
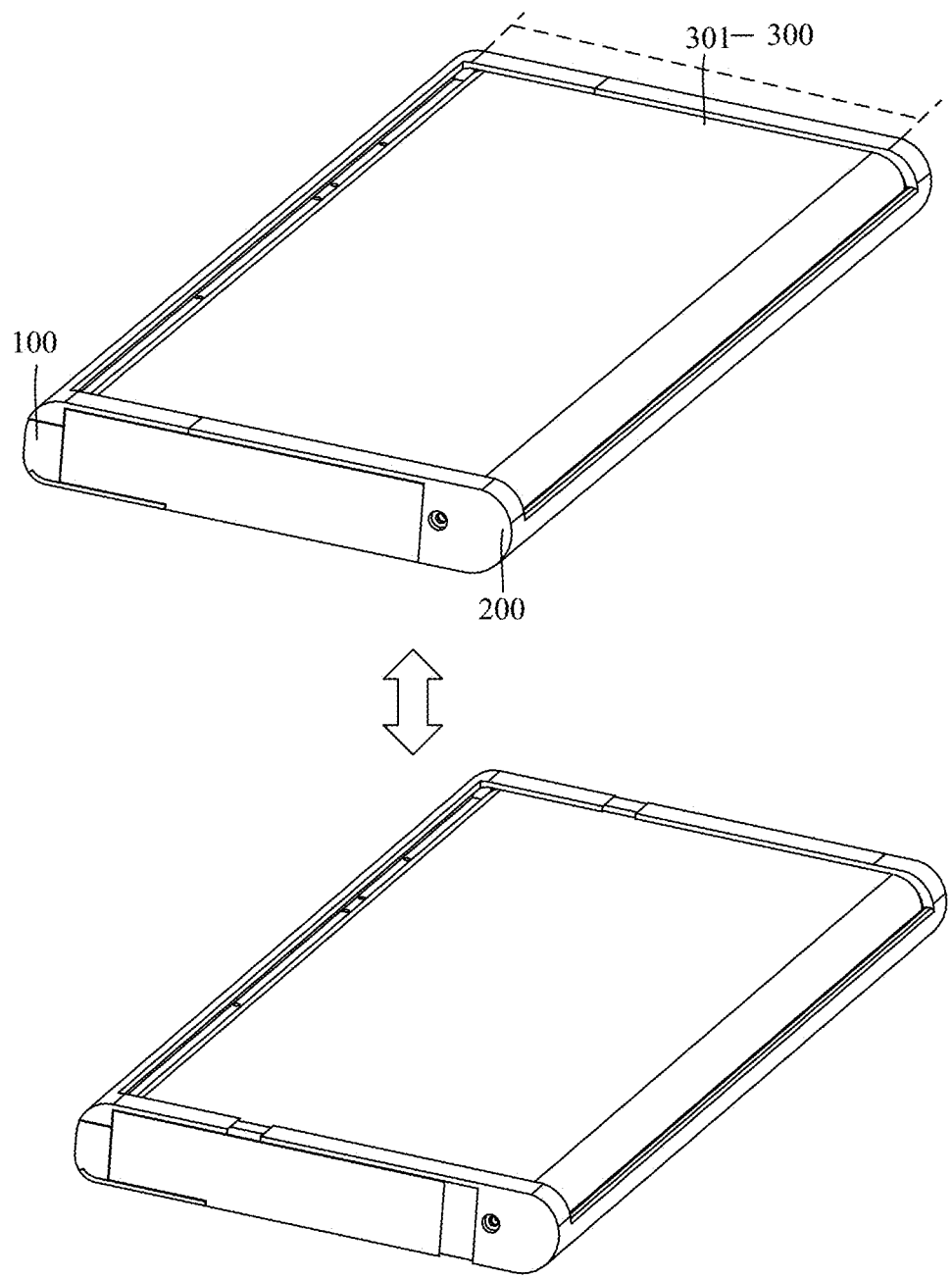
FIG. 1 is a schematic view of an effect of unrolling and rolling a flexible display panel in a display device according to some embodiments of the present disclosure.
Figure 2:
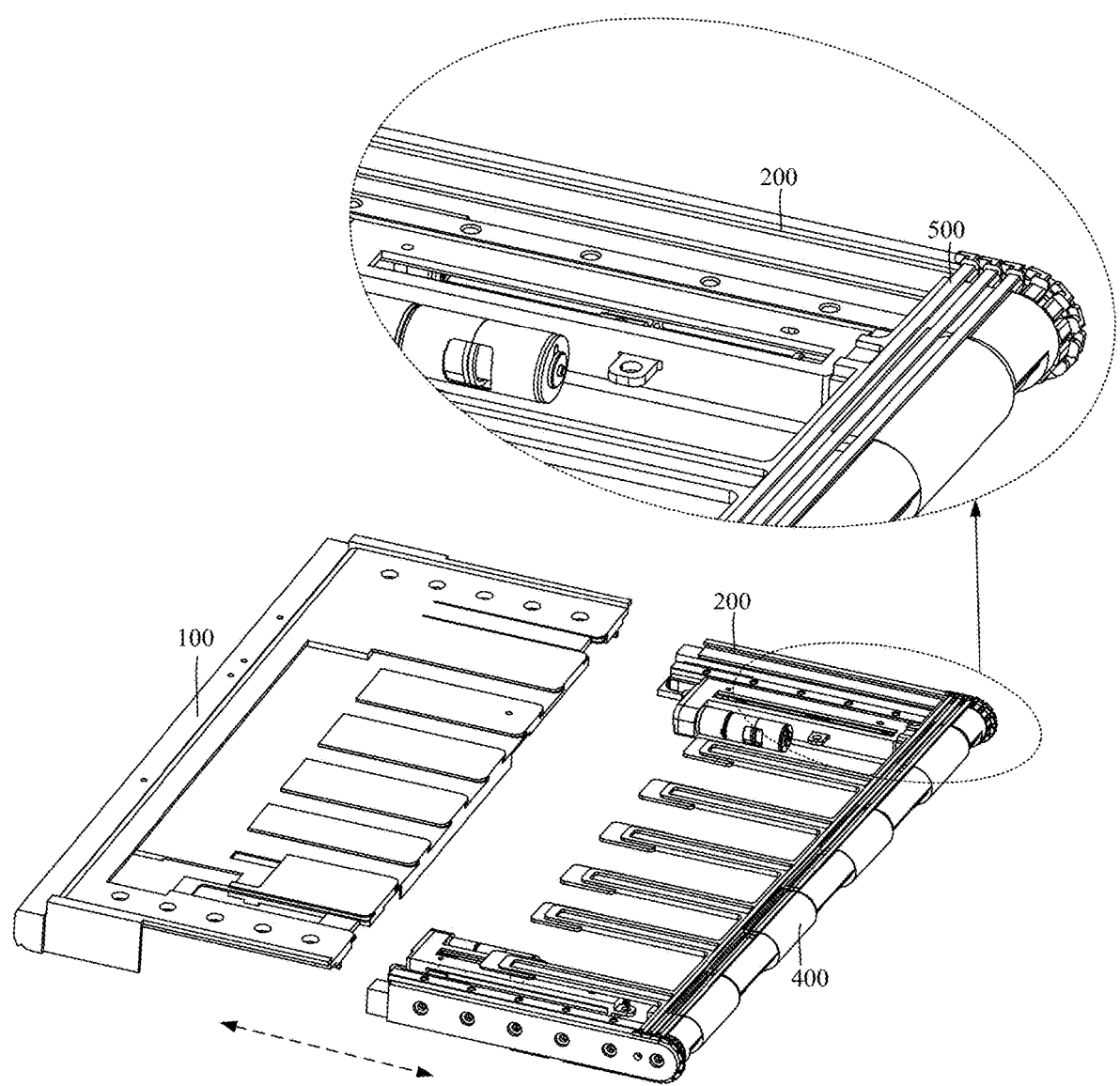
FIG. 2 is an exploded view of a partial structure of the display device shown in FIG. 1.
Figure 3:
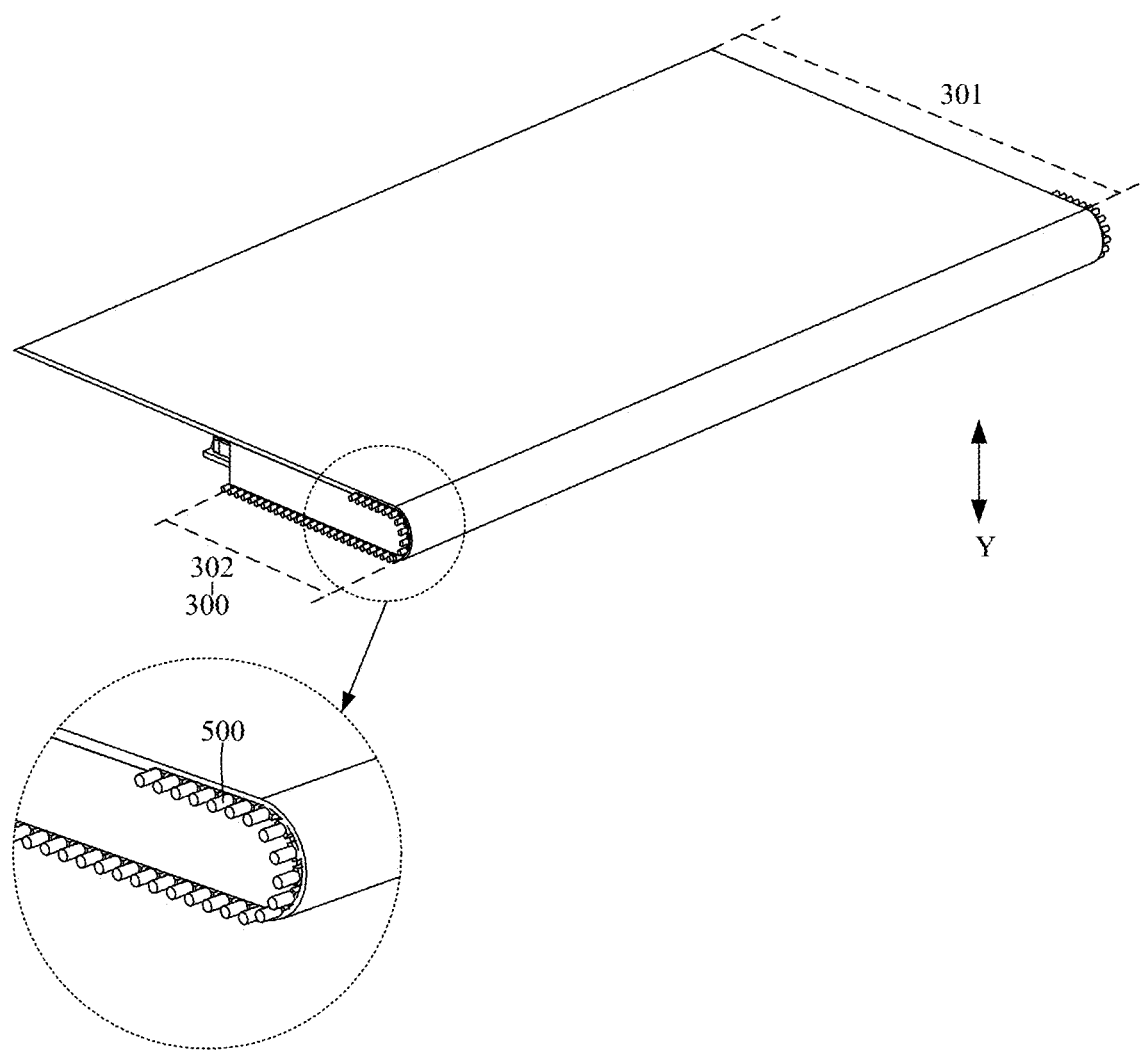
FIG. 3 is a schematic view of connection of a plurality of support columns and a flexible display panel according to some embodiments of the present disclosure.

Referring to FIG. 1 and FIG. 2, FIG. 1 is a schematic view of an effect of unrolling and rolling a flexible display panel in a display device according to some embodiments of the present disclosure, and FIG. 2 is an exploded view of a partial structure of the display device shown in FIG. 1. The display device is any product or assembly with a display and sliding rolling function, such as a mobile phone, a tablet computer, a television, a display, a laptop computer, a digital photo frame, and a navigator. The display device includes a first housing 100, at least one second housing 200, a flexible display panel 300, a reel 400, and a plurality of support columns 500. It should be noted that FIG. 2 only shows some of the plurality of support columns 500 for clear description of a position of the reel 400. For a clear position relationship of the plurality of support columns 500 and the flexible display panel 300, referring to FIG. 3, FIG. 3 is a schematic view of connection of a plurality of support columns and a flexible display panel according to some embodiments of the present disclosure.

The second housing 200 in the display device is slidably connected to the first housing 100.

The flexible display panel 300 in the display device includes a planar display portion 301 and a rollable display portion 302. The planar display portion 301 in the flexible display panel 300 is secured on the first housing 100.

The reel 400 in the display device is disposed in the second housing 200 and is connected to the second housing 200, and the rollable display portion 302 in the flexible display panel 300 includes a first portion wound over the reel 400 and a second portion parallel to the planar display portion in the display device.

The plurality of support columns 500 in the display device are arranged in an array. Two ends of the support column 500 are slidably connected to the second housing 200, the support column 500 is fixedly connected to a rear face of the rollable display portion 302 in the flexible display panel 300, and at least some of the plurality of support columns 500 are in contact with a side, facing away from the first housing 100, of the reel 400 in a slide direction of the second housing 200 relative to the first housing 100. Generally, the flexible display panel 300 includes a display face and a non-display face that are opposite. For convenience of subsequent descriptions, a front face of the flexible display panel 300 is the display face, and a rear face of the flexible display panel 300 is the non-display face.

In the embodiments of the present disclosure, in the case that the second housing 200 in the display device slides in a direction away from the first housing 100, the second housing 200 drives the rollable display portion 302 in the flexible display panel 300 to slide from the second housing 200 under the action of the reel 400, such that most of a display face of the planar display portion 301 in the flexible display panel 300 and most of a display face of the rollable display portion 302 in the flexible display panel 300 are in a same plane (increasing a size of a region of the flexible display panel for displaying screens) to display the screens. In the case that the second housing 200 in the display device slides in a direction approaching the first housing 100, the second housing 200 drives the rollable display portion 302 in the flexible display panel 300 to slide into the second housing 200 under the action of the reel 400, such that the size of the region of the flexible display panel for displaying screens is reduced for portability. As the rollable display portion 302 in the flexible display panel 300 requires to be slid and rolled, and the flexible display panel 300 is flexible, the plurality of support columns 500 (arranged in an array in a direction of sliding and rolling the rollable display portion) are disposed on the rear face of the rollable display portion 302 of the flexible display panel 300, and two ends of the plurality of support columns 500 are slidably connected to the second housing 200. As such, the plurality of support columns 500 efficiently support the flexible display panel 300, the flexibility of the flexible display panel 300 in a Y axis direction is limited based on matching of the second housing 200, and a risk of an uneven phenomenon in the flexible display panel 300 is efficiently reduced. Thus, a flatness of the flexible display panel 300 is great, and a display effect of the display device is further great. In addition, in some practices, a tension structure is additionally disposed in a cavity between the first housing 100 and the second housing 200 of the display device to tension the flexible display panel 300. In the embodiments of the present disclosure, the plurality of support columns 500 are attached to the rear face of the flexible display panel 300 and are matched with the second housing 200 to tension the flexible display panel 300, such that a space of the cavity in the display device is saved for miniaturization of the display device.

It should be noted that the embodiments of the present disclosure are described by taking the first housing 100 being a fixed housing in a sliding and rolling display device and the second housing 200 being a flexible housing in the sliding and rolling display device as an example.

In summary, a display device is provided in the embodiments of the present disclosure. The display device includes a first housing, at least one second housing, a flexible display panel, a reel, and a plurality of support columns. As the plurality of support columns are disposed on a rear face of the rollable display portion of the flexible display panel, and two ends of the plurality of support columns are slidably connected to the second housing, such that the plurality of support columns efficiently support the flexible display panel, the flexibility of the flexible display panel in a Y axis direction is limited based on matching of the second housing, and a risk of an uneven phenomenon in the flexible display panel is efficiently reduced. Thus, a flatness of the flexible display panel is great, and a display effect of the display device is further great.

Figure 4:
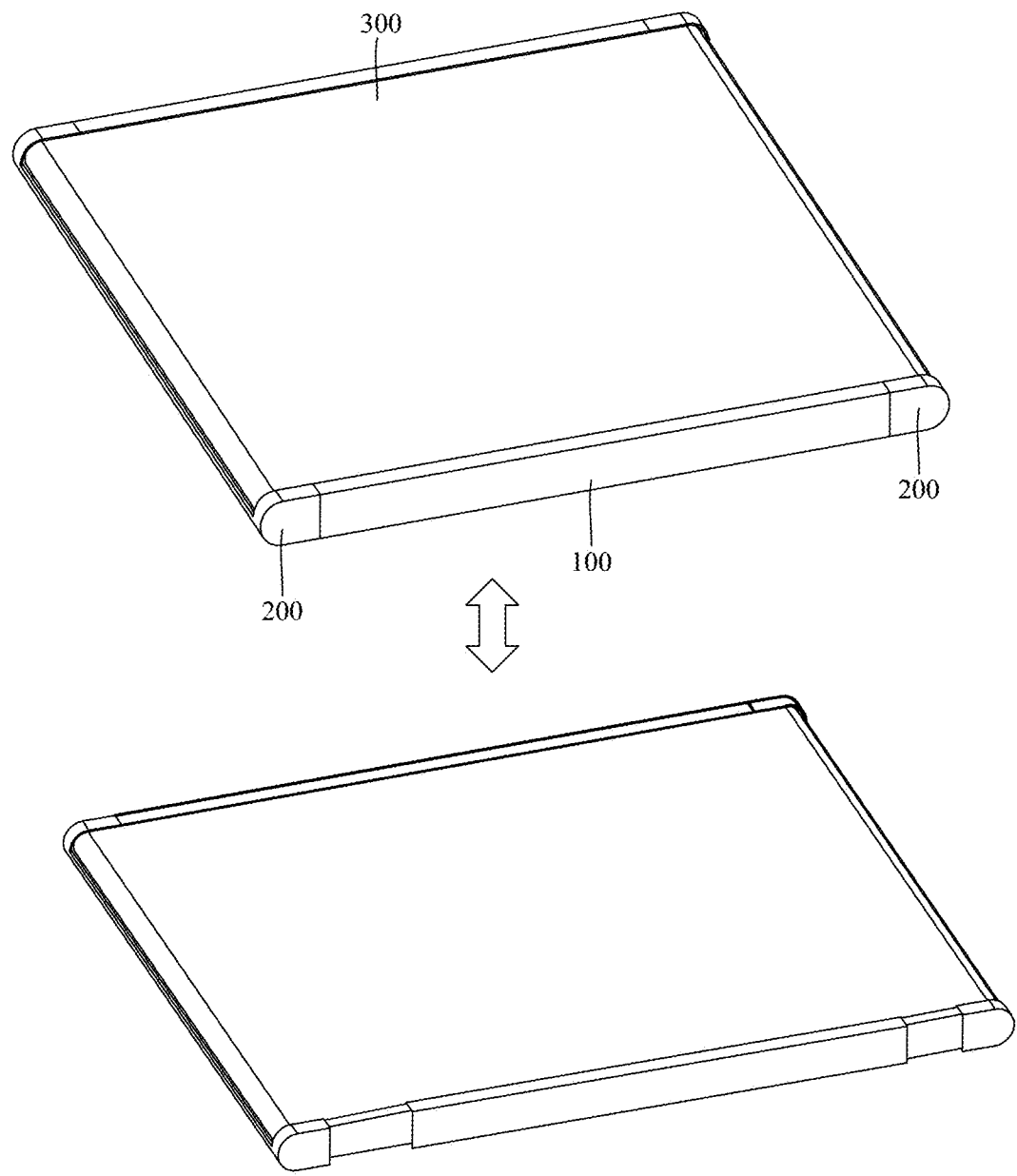
FIG. 4 is a schematic view of another effect of unrolling and rolling a flexible display panel in a display device according to some embodiments of the present disclosure.

In some embodiments of the present disclosure, one second housing 200 is defined in the display device, and the second housing 200 is disposed on any of two opposite sides of the first housing 100 upon unrolling of the flexible display panel 300. As shown in FIG. 2, the second housing 200 is disposed on a right side of the first housing 100 and is slidably connected to the first housing 100. Referring to FIG. 4, FIG. 4 is a schematic view of another effect of unrolling and rolling a flexible display panel in a display device according to some embodiments of the present disclosure. In some embodiments, two second housings 200 are defined in the display device, the two second housings 200 are respectively disposed on two opposite sides of the first housing 100 upon unrolling of the flexible display panel 300 and are slidably connected to the first housing 100. It should be noted that the following embodiments are described by taking one second housing 200 being slidably connected to the first housing 100 as an example for convenience of description.

In some embodiments, in conjunction with FIG. 2 and FIG. 3, in sliding of the second housing 200 in the display device relative to the first housing 100, at least one of the plurality of support columns 500 in the display device is in contact with the side, facing away from the first housing 100, of the reel 400 in the slide direction of the second housing 200 relative to the first housing 100. In this case, in the case that the second housing 200 in the display device slides in a direction approaching or away from the first housing 100, the support columns 500 are disposed on a side, facing away from the first housing 100, of the reel 400, such that some of the support columns 500 always support the rollable display portion 302 of the flexible display panel 300 wound over the reel 400 in the case that a first portion of the rollable display portion 302 of the flexible display panel 300 is wound over the reel 400 and slides along the reel 400. Thus, the great warping phenomenon in the sliding and rolling process is avoided, the flatness of the flexible display panel 300 is great, and a display effect of the display device is further great.

Figure 5:
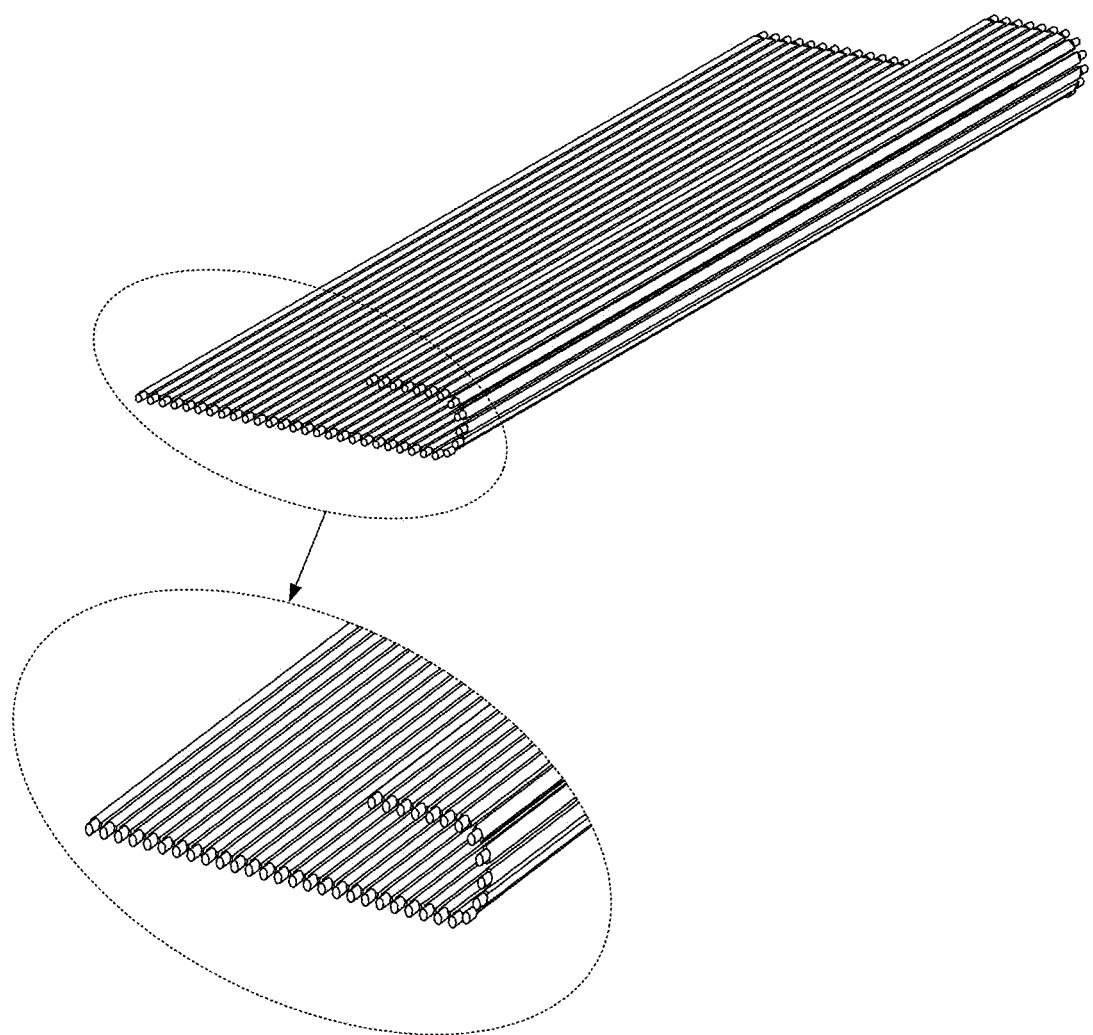
FIG. 5 is a schematic view of distribution of a plurality of support columns according to some embodiments of the present disclosure.

In the embodiments of the present disclosure, referring to FIG. 5, FIG. 5 is a schematic view of distribution of a plurality of support columns according to some embodiments of the present disclosure. The plurality of support columns 500 in the display device are equally spaced apart on the rear face of the rollable display portion 302 of the flexible display panel 300. In this case, as the plurality of support columns 500 are equally spaced apart on the rear face of the rollable display portion 302 of the flexible display panel 300, support forces from the plurality of support columns 500 on support the rollable display portion 302 of the flexible display panel 300 are uniform, and thus the support on the flexible display panel 300 is ensured. Illustratively, widths of the plurality of support columns 500 are equal, and a distance between each two adjacent support columns 500 ranges from 1 mm to 1.5 mm, for example, 1 mm, which is not limited in the embodiments of the present disclosure.

Figure 6:
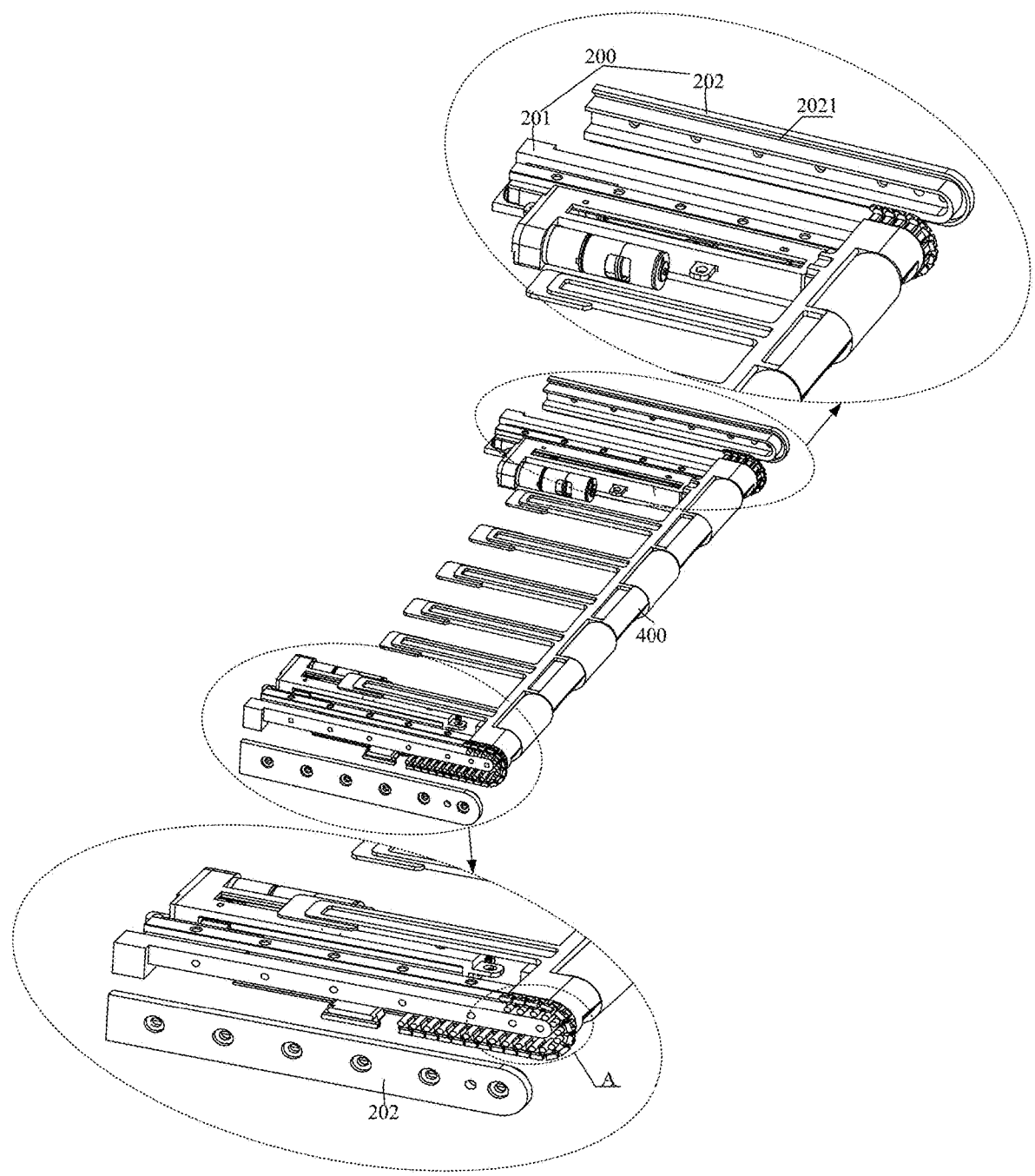
FIG. 6 is an exploded view of a partial structure of another display device according to some embodiments of the present disclosure.
Figure 7:
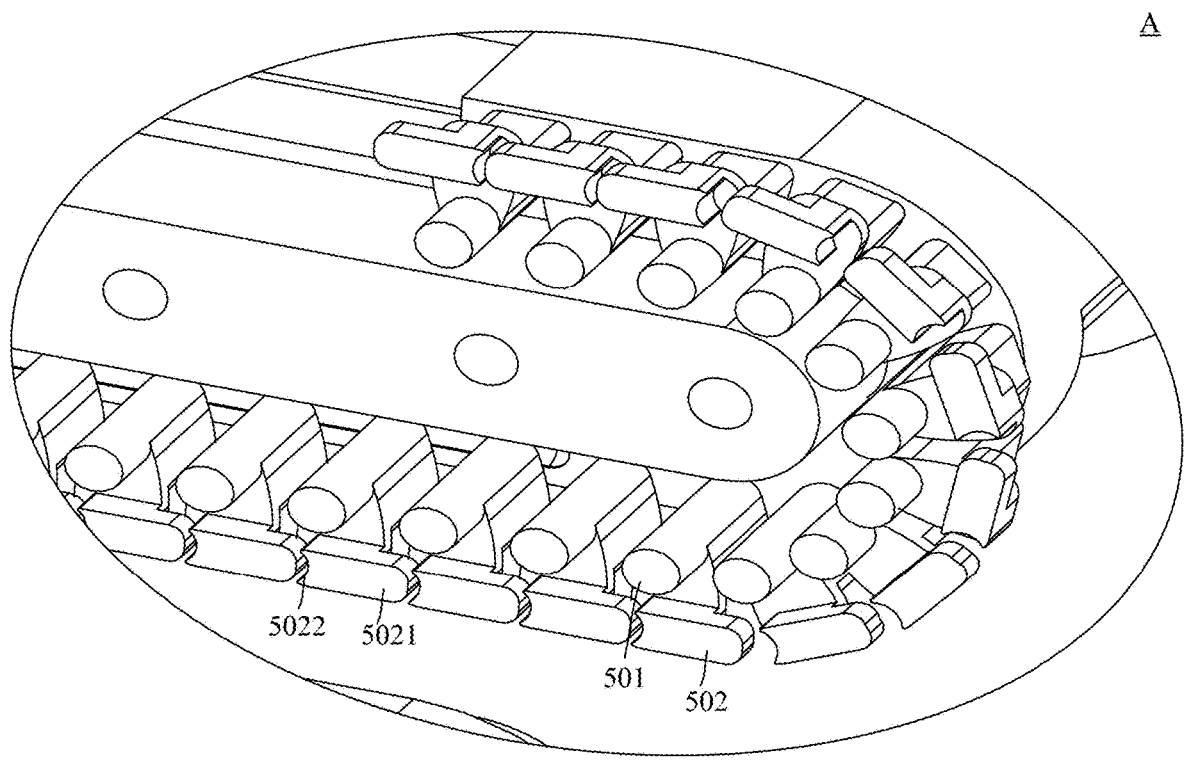
FIG. 7 is a partially enlarged view taken at an A position shown in FIG. 6.
Figure 8:
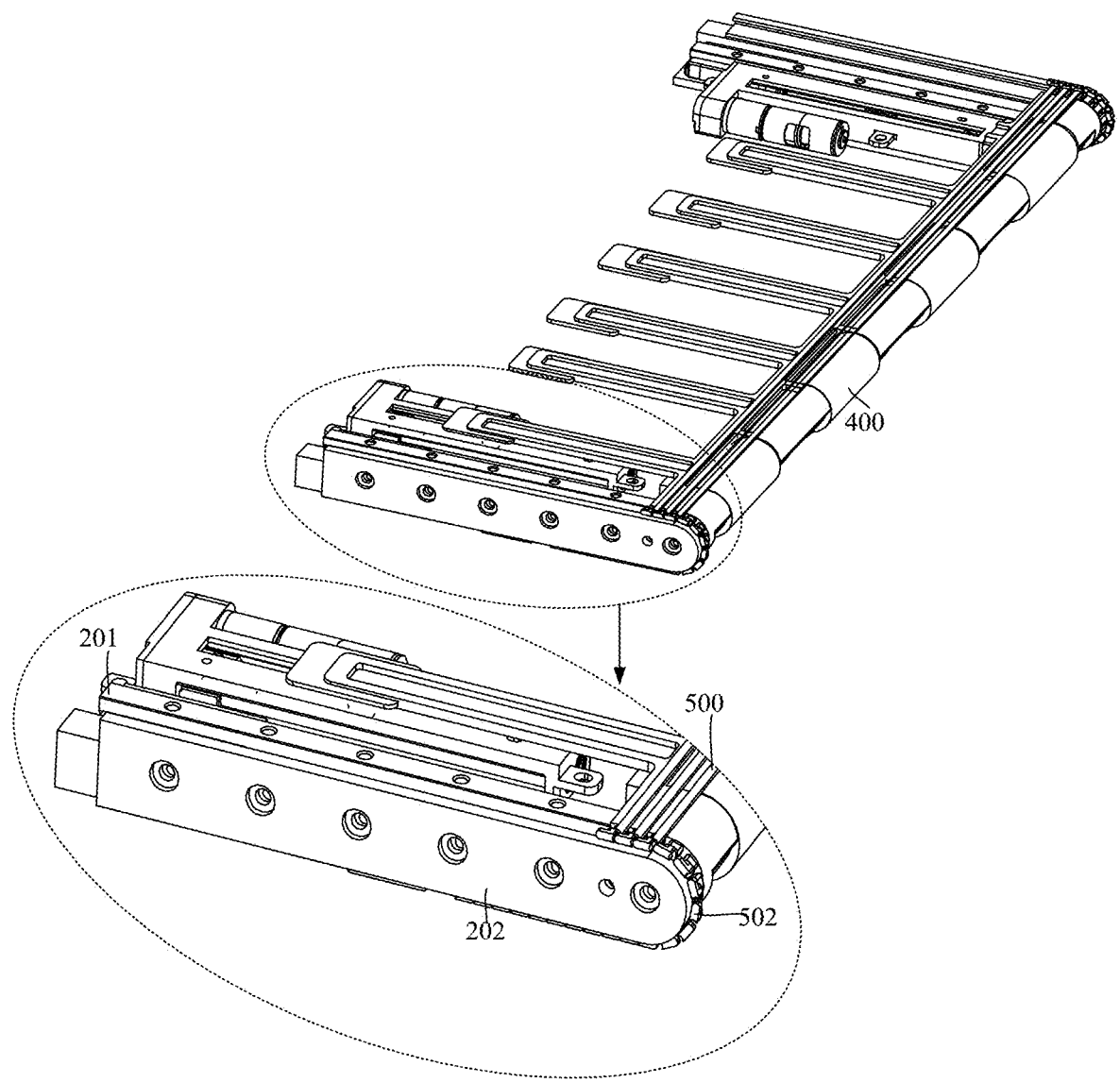
FIG. 8 is a schematic view of assembly of the display device shown in FIG. 6.

In some embodiments, referring to FIG. 6, FIG. 7, and FIG. 8, FIG. 6 is an exploded view of a partial structure of another display device according to some embodiments of the present disclosure, FIG. 7 is a partially enlarged view taken at an A position shown in FIG. 6, and FIG. 8 is a schematic view of assembly of the display device shown in FIG. 6. Two ends of each support column 500 in the display device are provided with first slide protrusions 501, and the second housing 200 in the display device includes a support housing 201 and two limit members 202 respectively and fixedly connected to two ends of the support housing 201. The plurality of support columns are disposed between the two limit members 202, a slideway 2021 is defined in sides, facing towards the plurality of support columns 500, of the two limit members 202, and at least part of the first slide protrusions 501 are disposed in the slideway 2021. In this case, as the slideway 2021 is defined in sides, facing towards the plurality of support columns 500, of the limit members 202, the first slide protrusions 501 are disposed on the two ends of the support column 500, and at least part of the first slide protrusions 501 on two ends of the support column 500 are disposed in the slideway 2021 of the limit member 202, the flexible display panel 300 is slidably connected to the second housing 200 through the plurality of support columns 500, such that the flexible display panel 300 is smoothly rolled and unrolled. Illustratively, sections of the first slide protrusions 501 on the two ends of the support column 500 are in circle shapes. In some embodiments, sections of the first slide protrusions 501 are in other shapes, which are not limited in the embodiments of the present disclosure. In the present disclosure, the limit member 202 is fixedly connected to the support housing 201 by a screw or in other connection manners.

Figure 9:
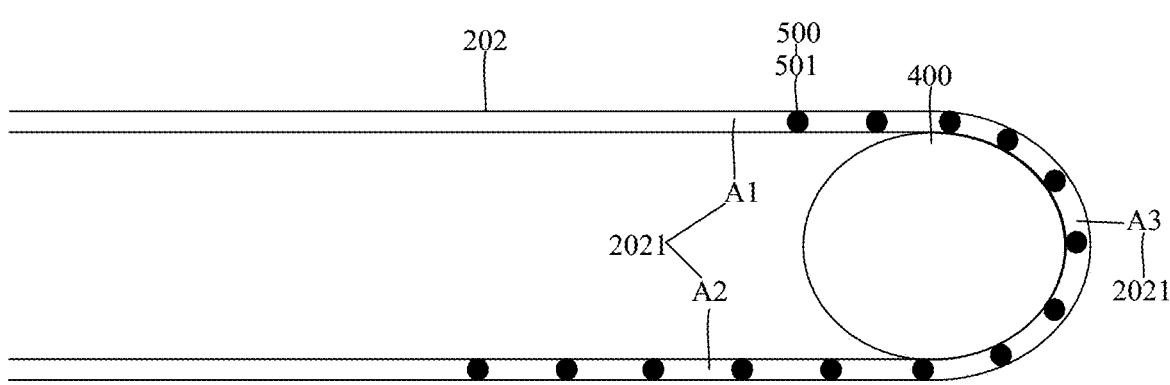
FIG. 9 is a schematic planar view of connection of a slideway and a first limit protrusion according to some embodiments of the present disclosure.
Figure 10:
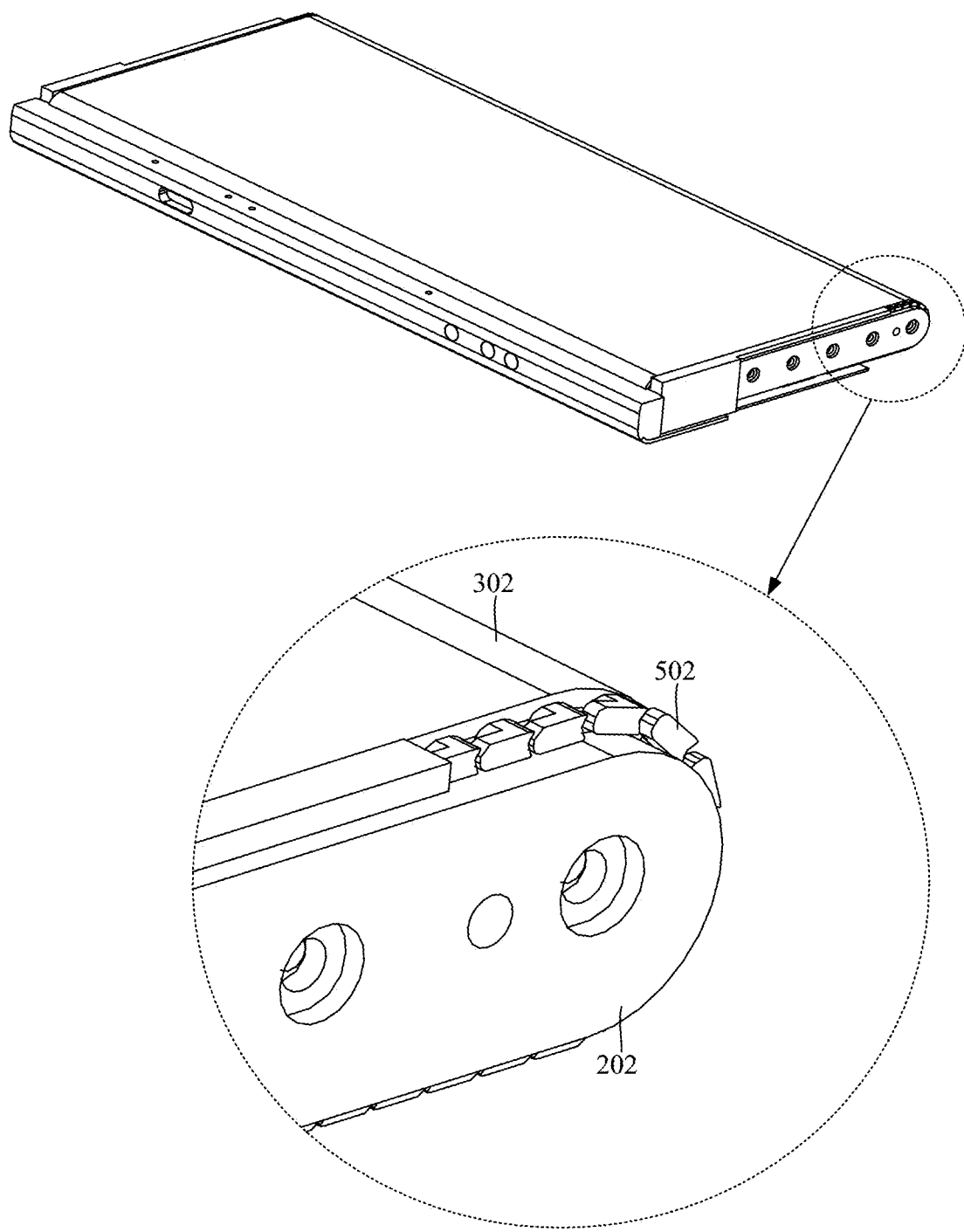
FIG. 10 is a schematic view of a position relationship of a flexible display panel and a first limit protrusion according to some embodiments of the present disclosure.

In some embodiments, referring to FIG. 6 and FIG. 9, FIG. 9 is a schematic planar view of connection of a slideway and a first limit protrusion according to some embodiments of the present disclosure. The slideway 2021 in each limit member 202 includes a first planar slideway A1 and a second planar slideway A2 that are opposite, and a curved slideway A3 in communication with both the first planar slideway A1 and the second planar slideway A2. The curved slideway A3 is disposed on the side, facing away from the first housing 100, of the reel 400. In this case, as the slideway 2021 in each limit member 202 includes the first planar slideway A1 and the second planar slideway A2 that are opposite, and the curved slideway A3 between the first planar slideway A1 and the second planar slideway A2, the plurality of support columns 500 connected to the rear face of the rollable display portion 302 of the flexible display panel 300 stably slide in the first planar slideway A1, the second planar slideway A2, and the curved slideway A3. In the present disclosure, in the case that the second housing 200 slides in the direction facing away from the first housing 100, most of the support columns 500 fixedly connected to the rear face of the rollable display portion 302 of the flexible display panel 300 are disposed in the first planar slideway A1, and the rear face of the rollable display portion 302 faces towards the second planar slideway A2. In the case that the second housing 200 slides in the direction approaching the first housing 100, most of the support columns 500 fixedly connected to the rear face of the rollable display portion 302 of the flexible display panel 300 are disposed in the second planar slideway A2, and the rear face of the rollable display portion 302 faces towards the first planar slideway A1.

In some embodiments, referring to FIG. 6, FIG. 7, FIG. 8, and FIG. 10, FIG. 10 is a schematic view of a position relationship of a flexible display panel and a first limit protrusion according to some embodiments of the present disclosure. Two ends of each support column 500 in the display device are further provided with first limit protrusions 502 adjacent to the first slide protrusions 501. The first limit protrusions 502 are outside the slideway 2021 of the limit member 202, and a portion, connected to the support column 500, of the rollable display portion 302 of the flexible display panel 300 is disposed between two of the first limit protrusions 502 in the support column 500. In this case, as two ends of each support column 500 are provided with the first limit protrusions 502 adjacent to the first slide protrusions 501, the first limit protrusions 502 are outside the slideway of the limit member 202, and the portion, connected to the support column 500, of the flexible display panel 300 is disposed between two of the first limit protrusions 502 in the support column 500, the flexible display panel 300 is limited, the collision phenomenon between the flexible display panel 300 and a decoration housing of the display device is avoided, and the user experience is efficiently improved. It should be noted that the decoration housing is described in the following embodiments. Illustratively, in some embodiments, the first limit protrusions 502 on two ends of the support column 500 are spaced apart. That is, a support column 500 not provided with the first limit protrusion 502 is disposed between two support columns 500 provided with the first limit protrusions 502. The embodiments of the present disclosure are described by taking two ends of each support column 500 being provided with the first limit protrusions 502 as an example.

In the embodiments of the present disclosure, as shown in FIG. 7 and FIG. 8, the first limit protrusions 502 in the support column 500 are provided with protrusion portions 5021 and recess portions 5022 that are opposite, and an arrangement direction of the protrusion portions 5021 and the recess portions 5022 is parallel to the direction of sliding and rolling the flexible display panel 300. In two adjacent first limit protrusions 502, at least part of the protrusion portion 5021 of one of the two adjacent first limit protrusions 502 is in the recess portion 5022 of the other of the two adjacent first limit protrusions 502. In this case, as the protrusion portions 5021 and the recess portions 5022 are disposed in the first limit protrusions 502, the effect between two adjacent first limit protrusions 502 is efficiently avoided in the case that the support column 500 connected to the rollable display portion 302 of the flexible display panel 300 slides in the curved slideway A3 in the slideway 2021. Thus, the sliding of the support column 500 in the slideway 2021 is ensured, and the smooth unrolling and rolling of the flexible display panel 300 are ensured. In the present disclosure, in two adjacent first limit protrusions 502, a space is present between the protrusion portion 5021 of one of the two adjacent first limit protrusions 502 and the recess portion 5022 of the other of the two adjacent first limit protrusions 502, such that the effect between two adjacent first limit protrusions 502 is further avoided in the case that the support column 500 connected to the rollable display portion 302 of the flexible display panel 300 slides in the curved slideway A3 in the slideway 2021.

Figure 11:
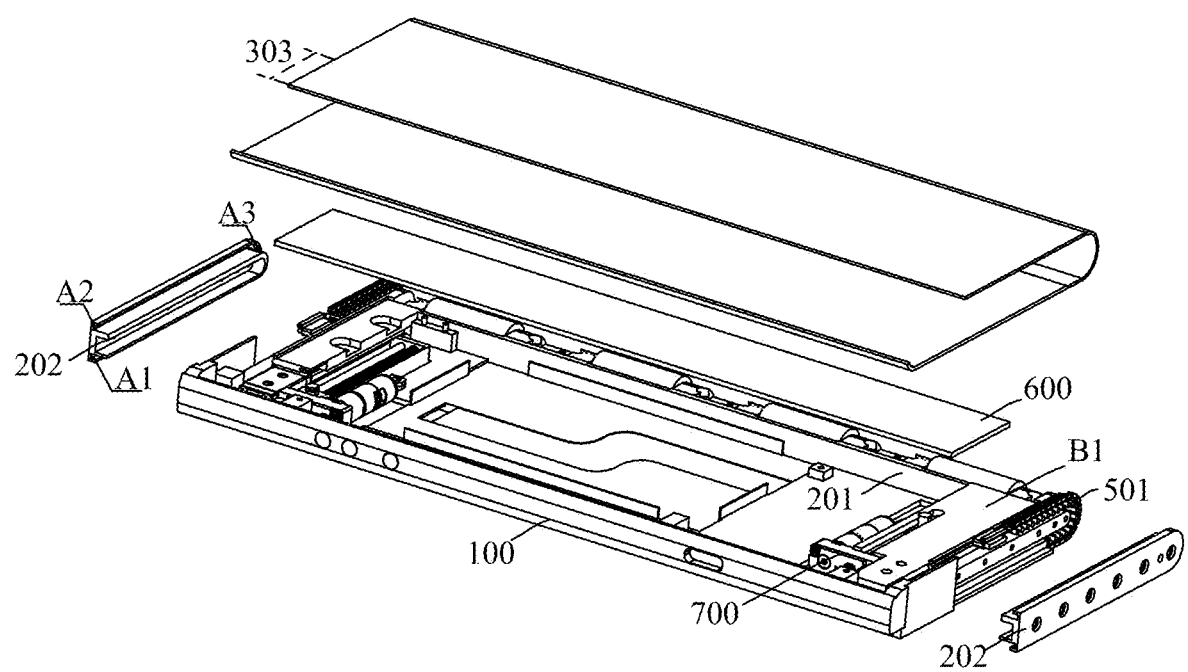
FIG. 11 is an exploded view of a partial structure of another display device according to some embodiments of the present disclosure.
Figure 12:
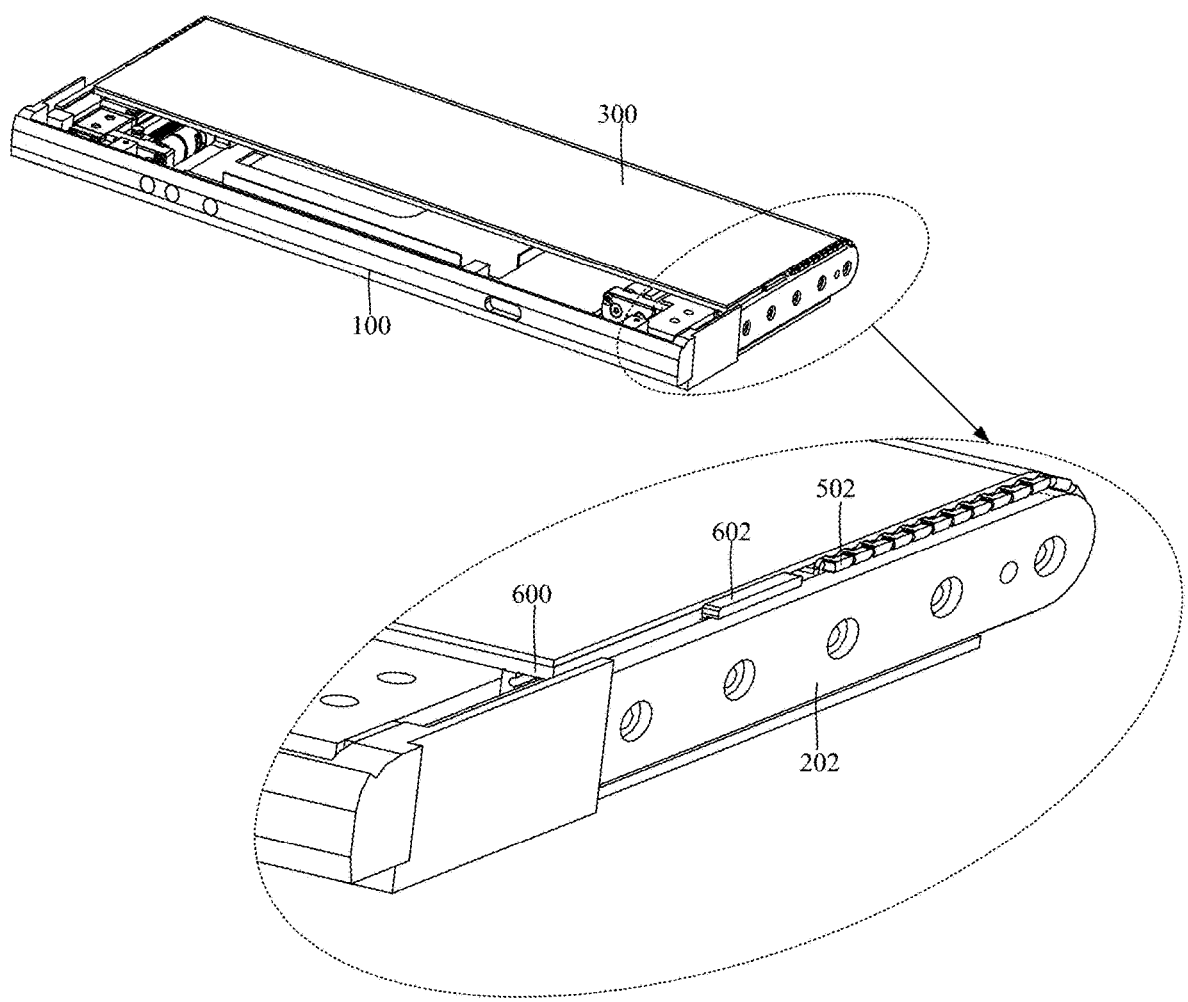
FIG. 12 is a schematic view of assembly of the display device shown in FIG. 11.

In some embodiments, referring to FIG. 11 and FIG. 12, FIG. 11 is an exploded view of a partial structure of another display device according to some embodiments of the present disclosure, and FIG. 12 is a schematic view of assembly of the display device shown in FIG. 11. The flexible display panel 300 in the display device further includes a non-display portion 303 on a side, facing away from the planar display portion 301, of the rollable display portion 302 of the flexible display panel 300, and the display device further includes a support plate 600. The support plate 600 is fixedly connected to a rear face of the non-display portion 303 of the flexible display panel 300, and two ends of the support plate 600 are slidably connected to the slideway 2021 of the limit member 202. In this case, as the non-display portion 303 of the flexible display panel 300 is fixedly connected to the support plate 600, and two ends of the support plate 600 are slidably connected to the slideway 2021 of the limit member 202, the warping phenomenon of the non-display portion 303 of the flexible display panel 300 is efficiently avoided in the sliding and rolling process of the flexible display panel 300. In addition, the non-display portion 303 of the flexible display panel 300 is prevented from collision with other structures, and the reliability of the display device is great. Illustratively, the support plate 600 in the display device is slidably in communication with both the second planar slideway A2 in the slideway 2021.

Figure 13:
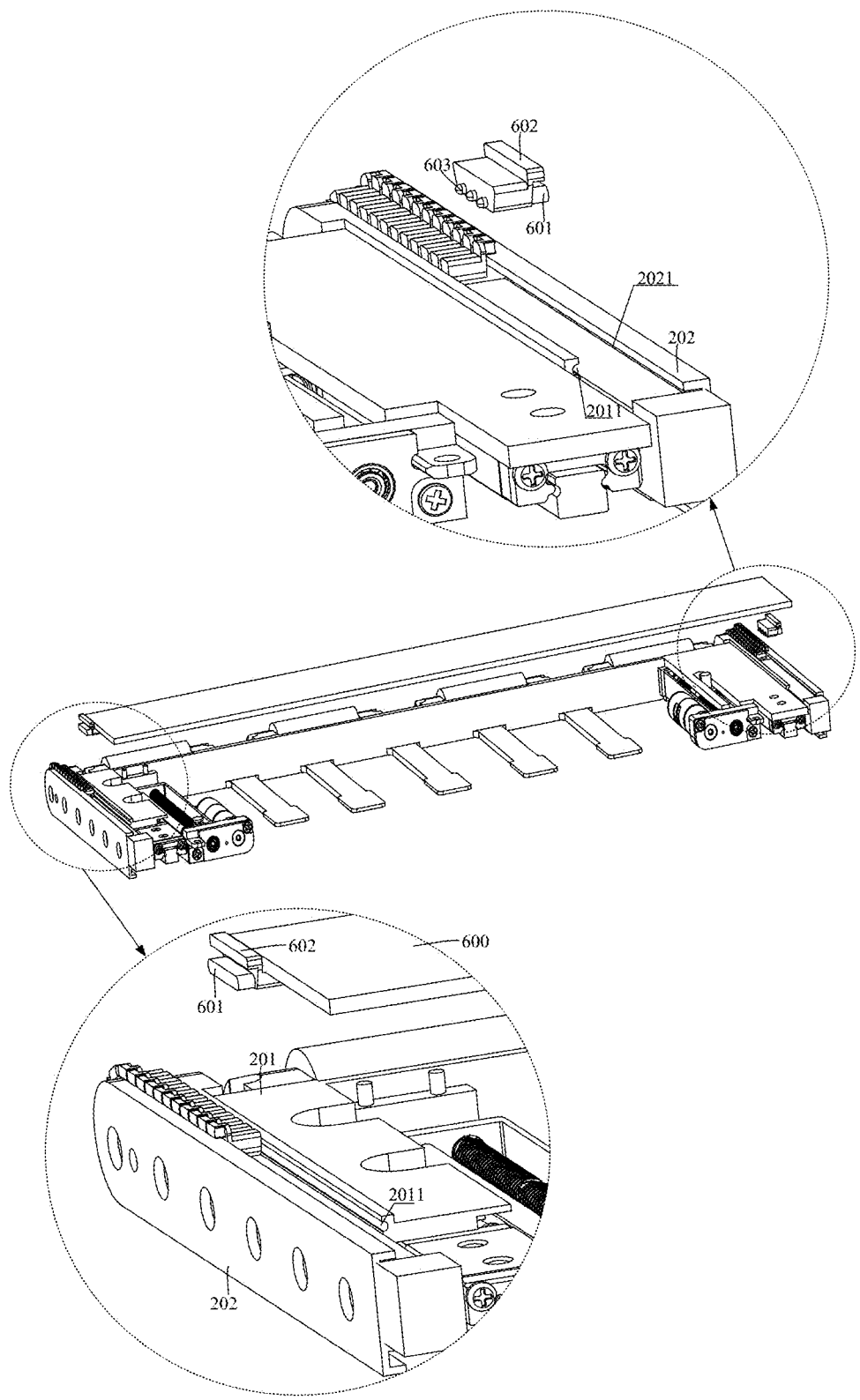
FIG. 13 is an exploded view of a partial structure of another display device according to some embodiments of the present disclosure.

In the embodiments of the present disclosure, referring to FIG. 12 and FIG. 13, FIG. 13 is an exploded view of a partial structure of another display device according to some embodiments of the present disclosure. Two ends of each support plate 600 are both provided with second slide protrusions 601 and second limit protrusions 602. At least part of the second slide protrusions 601 are in the slideway 2021 of the limit member 202, the second limit protrusions 602 are outside the slideway 2021 of the limit member 202, and a portion, connected to the support plate 600, of the non-display portion 303 of the flexible display panel 300 is disposed between two of the second limit protrusions 602 in the support plate 600. In this case, as two ends of each support plate 600 are provided with the second slide protrusions 601 and the second limit protrusions 602, and the second slide protrusions 601 are slidably connected to the slideway 2021, the sliding between the support plate 600 and the slideway 2021 is ensured. In addition, as the portion, connected to the support plate 600, of the non-display portion 303 of the flexible display panel 300 is disposed between two of the second limit protrusions 602 on two ends of the support plate 600, the flexible display panel 300 is limited, and the collision phenomenon between the flexible display panel 300 and the decoration housing is avoided. In the present disclosure, two ends of the support plate 600 are further provided with auxiliary slide protrusions 603 opposite to the second slide protrusions 601, the support housing 201 is further provided with a strip-shaped auxiliary slideway 2011 opposite to the slideway 2021 of the limit member 202, and at least part of the auxiliary slide protrusions 603 are disposed in the auxiliary slideway 2011. As such, the auxiliary slideway 2011 is matched with the auxiliary slide protrusion 603, such that the support plate 600 has a tension force in the direction of the support plate 600, and the support plate 600 further supports the non-display portion 303 of the flexible display panel 300.

In some embodiments, as shown in FIG. 12, faces, facing away from the support column 500, of the first limit protrusions 502 are flush with faces, facing away from the support plate 600, of the second limit protrusions 602. In this case, as the faces, facing away from the support column 500, of the first limit protrusions 502 are flush with the faces, facing away from the support plate 600, of the second limit protrusions 602, the display device has a great appearance, and the assembly of the subsequent structures is facilitated.

Figure 14:
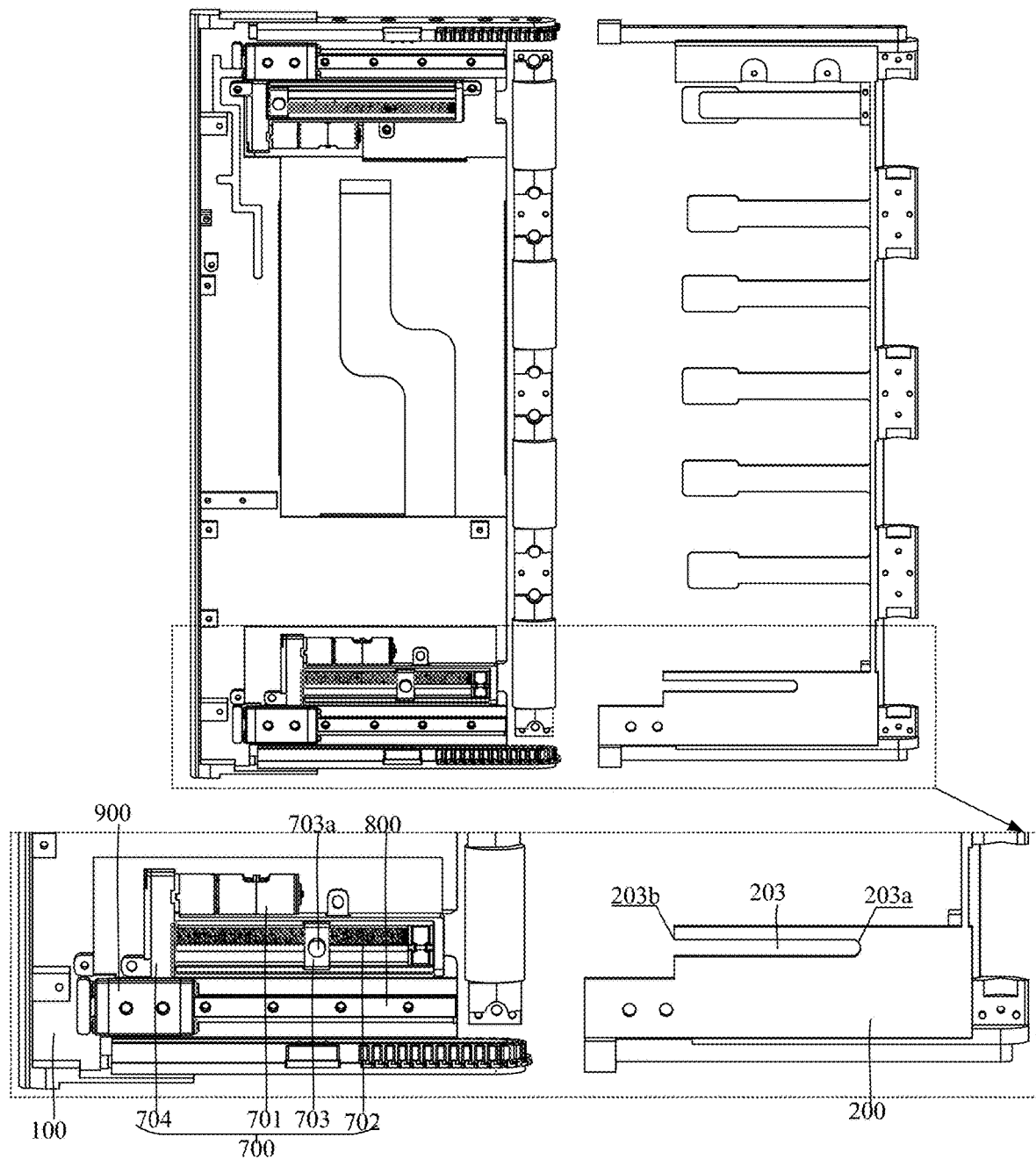
FIG. 14 is an exploded view of a partial structure of another display device according to some embodiments of the present disclosure.
Figure 15:
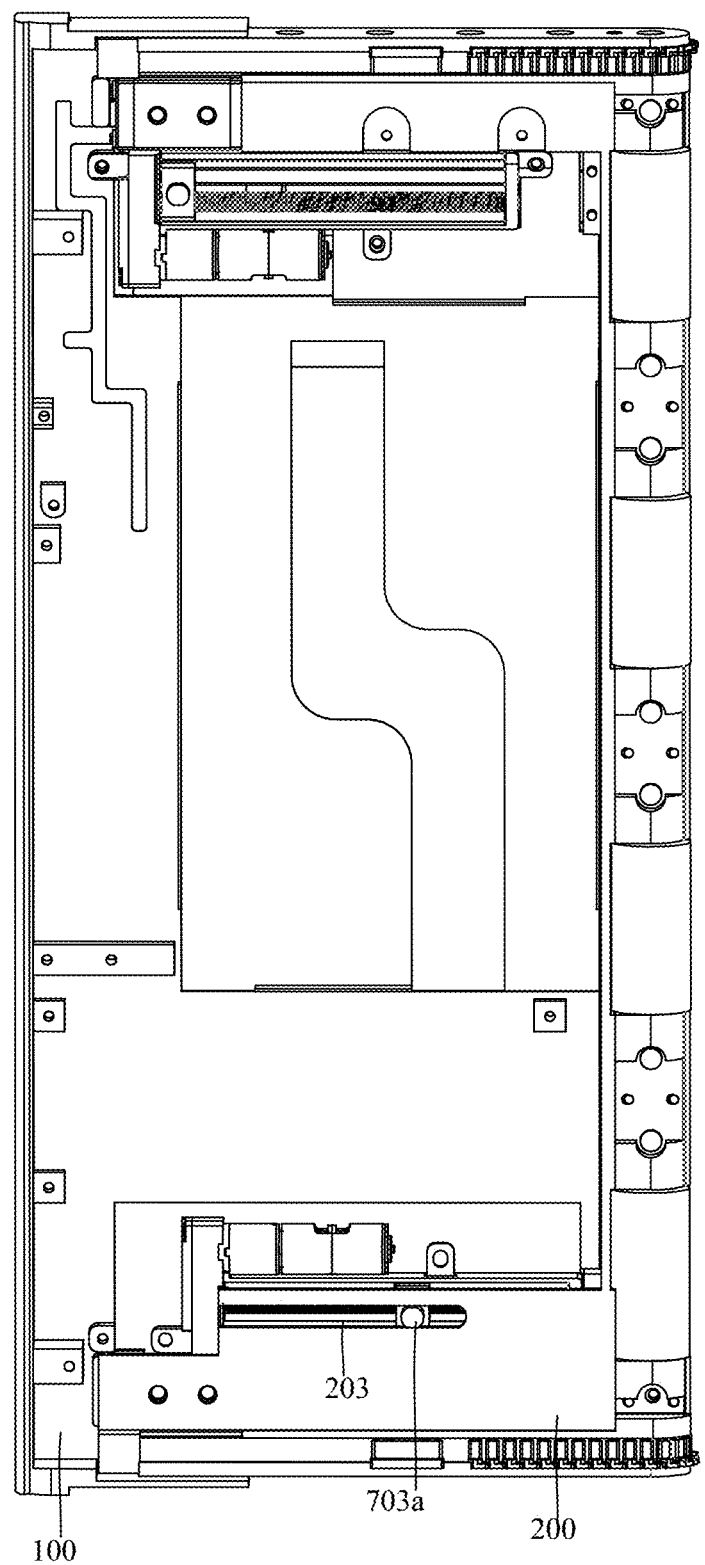
FIG. 15 is a schematic view of assembly of the display device shown in FIG. 14.

In the embodiments of the present disclosure, referring to FIG. 14 and FIG. 15, FIG. 14 is an exploded view of a partial structure of another display device according to some embodiments of the present disclosure, and FIG. 15 is a schematic view of assembly of the display device shown in FIG. 14. The display device further includes a drive assembly 700. The drive assembly 700 is connected to the first housing 100 and the second housing 200 in the display device, and is configured to drive the second housing 200 to slide relative to the first housing 100. In this case, as the drive assembly 700 is disposed in the display device, and the drive assembly 700 is capable of driving the second housing 200 to slide relative to the first housing 100, the user experience is efficiently improved. In the present disclosure, the display device further includes a control assembly (not shown in the drawings). The control assembly is connected to the drive assembly 700, and the user can control the drive assembly 700 to drive the sliding between the first housing 100 and the second housing 200 by the control assembly.

In some embodiments, as shown in FIG. 14 and FIG. 15, the drive assembly 700 in the display device further includes a drive motor 701, a screw 702, and a first slide block 703. The drive motor 701 is secured on the first housing 100 and is connected to an end of the screw 702, and the first slide block 703 is sleeved on the screw 702, is connected to the second housing 200, and is configured to move in a lengthwise direction of the screw 702 in rotation of the screw 702 driven by the drive motor 701 to drive the second housing 200 to slide relative to the first housing 100. In this case, the drive motor 701 drives the screw 702 to rotate in operation, and the screw 702 drives the first slide block 703 to slide in the lengthwise direction of the screw in rotation, such that the first slide block 703 drives the second housing 200 to slide relative to the first housing 100. Illustratively, in the case that the drive motor 701 drives the screw 702 to rotate in a clockwise direction, the first slide block 703 drives the second housing 200 to slide in a direction away from the first housing 100. In the case that the drive motor 701 drives the screw 702 to rotate in a counterclockwise direction, the first slide block 703 drives the second housing 200 to slide in a direction approaching the first housing 100. It should be noted that in some embodiments, other drive assemblies are used to drive the second housing 200 to slide relative to the first housing 100, which are not limited in the embodiments of the present disclosure. In the present disclosure, for reduction of the sizes of the drive motor 701 and the screw 702 in a direction perpendicular to the axial direction of the reel 400, the drive assembly 700 further includes a transfer assembly 704, and an arrangement direction of the drive motor 701 and the screw 702 is parallel to a direction of the axis of the reel 400. The transfer assembly 704 is connected to an output shaft of the drive motor 701 and an end of the screw 702, such that the rotation of the output shaft of the drive motor 701 is transferred to the end portion of the screw 702 through the transfer assembly 704. For example, the transfer assembly 704 includes two engaged gears (not shown in the drawings). The output shaft of the drive motor 701 is connected to one of the gears, and the end of the screw 702 is connected to the other of the gears.

In addition, two drive assemblies 700 are disposed to ensure that the drive assembly 700 drives the second housing 200 to stably slide relative to the first housing 100. The two drive assemblies 700 are disposed on two sides of the support housing 201, such that the two drive assemblies 700 simultaneously drive the second housing 200 to slide relative to the first housing 100.

Figure 16:
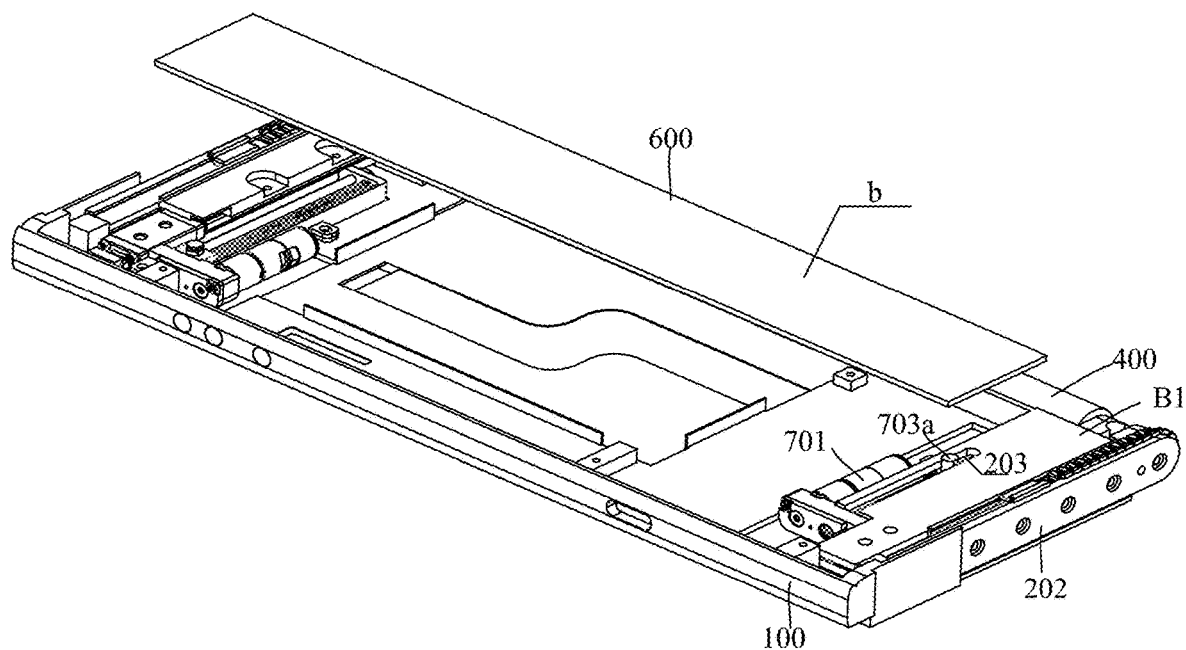
FIG. 16 is an exploded view of a partial structure of another display device according to some embodiments of the present disclosure.
Figure 17:
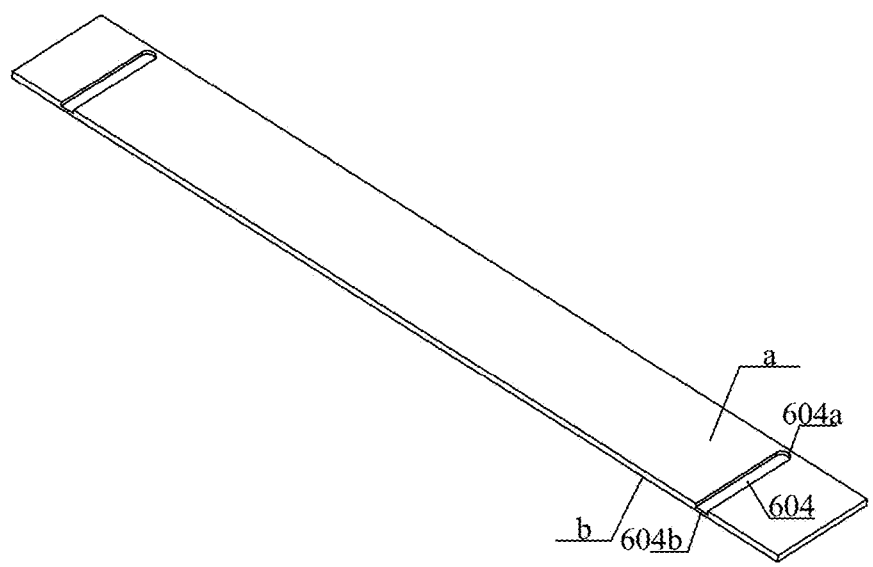
FIG. 17 is a schematic structural view of a support plate according to some embodiments of the present disclosure.

In the embodiments of the present disclosure, referring to FIG. 16 and FIG. 17, FIG. 16 is an exploded view of a partial structure of another display device according to some embodiments of the present disclosure, and FIG. 17 is a schematic structural view of a support plate according to some embodiments of the present disclosure. In the case that the display device includes a support plate 600, the second housing 200 in the display device includes a strip-shaped first drive slideway 203, and a second drive slideway 604 is defined in a side a, proximal to the second housing 200, of the support plate 600 (the support plate 600 includes two opposite sides, a side close to the second housing 200 is the side a, and a side facing away from the second housing is a side b). A lengthwise direction of the first drive slideway 203 and a lengthwise direction of the second drive slideway 604 both are perpendicular to an axial direction of reel 400, that is, the lengthwise direction of the first drive slideway 203 and the lengthwise direction of the second drive slideway 604 both are parallel to the slide direction of the second housing 200 relative to the first housing 100. An end, proximal to the reel 400, of the first drive slideway 203 is a first baffle end 203a, and an end, facing away from the reel 400, of the second drive slideway 604 is a second baffle end 604a. In addition, the first slide block 703 in the drive assembly 700 is provided with a rod 703a extending in the first drive slideway 203 and the second drive slideway 204. The rod 703a is configured to drive the second housing 200 to slide in a direction facing away from the first housing 100 upon contact with the first baffle end 203a of the first drive slideway 203, and drive the non-display portion 303 of the flexible display panel 300 to move through the support plate 600 upon contact with the second baffle end 604a of the second drive slideway 604 to drive the second housing 200 to slide in a direction approaching the first housing 100. In this case, as the first drive slideway 203 is disposed on the second housing 200, the first baffle end 203a is disposed in the first drive slideway, the second drive slideway 604 is disposed on the side, proximal to the second housing 200, of the support plate 600, and the second baffle end 604a is disposed in the second drive slideway 604, the drive motor 701 drives the screw 702 to rotate in a clockwise direction, such that the rod 703a in the first slide block 703 slides in the first drive slideway 203 in a direction approaching the first baffle end 203a, and drives the second housing 200 to slide in the direction away from the first housing 100 upon being contact with the first baffle end 203a. Thus, the flexible display panel 300 in the display device is unrolled.

Figure 18:
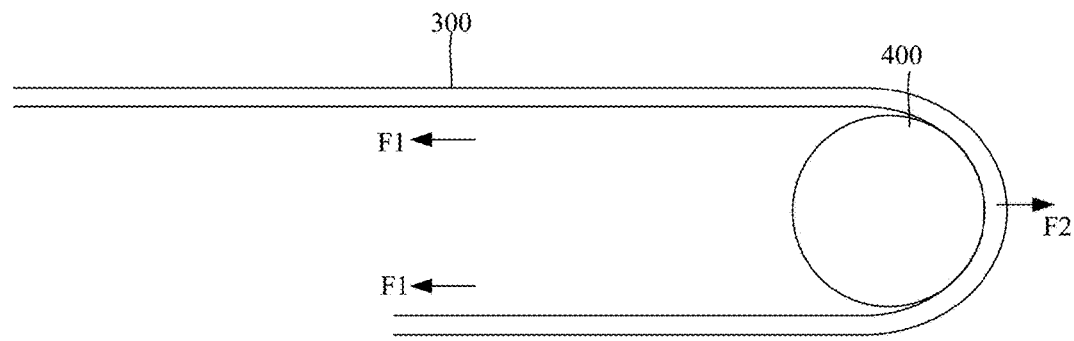
FIG. 18 is a schematic view of forces on a flexible display panel in an unrolling process according to some embodiments of the present disclosure.
Figure 19:
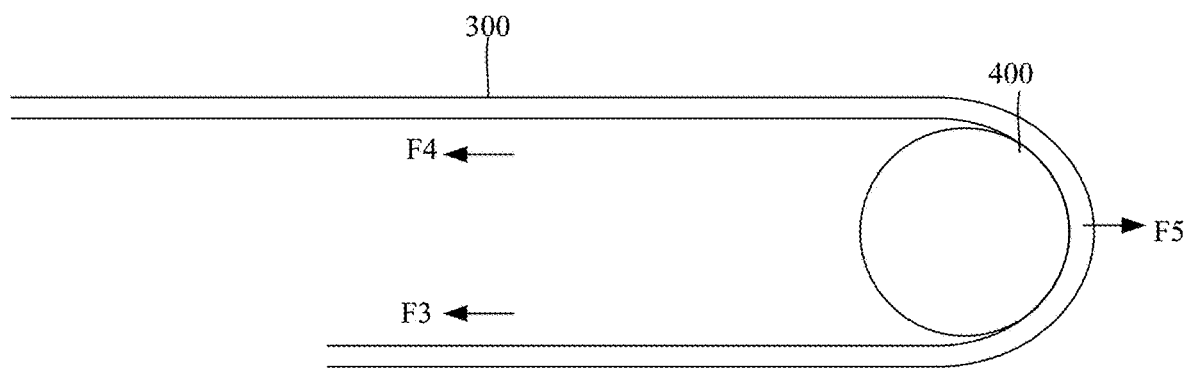
FIG. 19 is a schematic view of forces on a flexible display panel in a rolling process according to some embodiments of the present disclosure.

Illustratively, referring to FIG. 18, FIG. 18 is a schematic view of forces on a flexible display panel in an unrolling process according to some embodiments of the present disclosure. As shown in FIG. 18, in unrolling of the flexible display panel 300, first pull forces F1 in the same direction are supplied by the first housing 100 and the support plate 600 to the flexible display panel 300, and a second pull force F2 in an opposite direction with the first pull forces F1 is supplied by the reel 400 to the flexible display panel 300. As such, in unrolling of the flexible display panel 300, the flexible display panel 300 is always in a tension state, and a flatness of the flexible display panel 300 is great. The drive motor 701 drives the screw 702 to rotate in a counterclockwise direction, such that the rod 703a in the first slide block 703 slides in the second drive slideway 604 in a direction approaching the second drive slideway 604, and drives the second housing 200 to slide in the direction approaching the first housing 100 upon being contact with the second drive slideway 604. Thus, the flexible display panel 300 in the display device is rolled. Illustratively, referring to FIG. 19, FIG. 19 is a schematic view of forces on a flexible display panel in a rolling process according to some embodiments of the present disclosure. As shown in FIG. 19, in rolling of the flexible display panel 300, a push force F3 is supplied by the rod 703a in the first slide block 703 to the second baffle end 604a of the second drive slideway 604 in the support plate 600, a third pull force F4 is supplied by the first housing 100 to the flexible display panel 300, and a fourth pull force F5 in an opposite direction with the push force F3 and the third pull force F4 is supplied by the reel 400 to the flexible display panel 300, such that the support plate 600 greatly tensions the flexible display panel 300, and the flatness of the flexible display panel 300 is great.

In some embodiments, as shown in FIG. 14, FIG. 15, FIG. 16, and FIG. 17, a first opening 203b is defined in an end, facing away from the reel 400, of the first drive slideway 203 in the second housing 200, and a second opening 604b is defined in an end, close to the reel 400, of the second drive slideway 604 in the support plate 600. In this case, as the first opening 203b (opposite to the first baffle end) is defined in the end, facing away from the reel 400, of the first drive slideway 203 in the second housing 200, and the second opening 604b (opposite to the second baffle end) is defined in the end, close to the reel 400, of the second drive slideway 604 in the support plate 600, the rod 703a in the first slide block 703 smoothly slides from the first opening 203b in the first drive slideway 203 to the second drive slideway 604 in the support plate 600 in the case that the flexible display panel 300 in the display device changes from the unrolling state to the rolling state, and the rod 703a in the first slide block 703 smoothly slides from the second drive slideway 604 in the support plate 600 to the first drive slideway 203 in the second housing 200 in the case that the flexible display panel 300 in the display device changes from the rolling state to the unrolling state, such that a flexibility of sliding of the rod 703a in the first slide block 703 between the first drive slideway 203 and the second drive slideway 604.

In the embodiments of the present disclosure, as shown in FIG. 14, the display device further includes a fixed guide rail 800 and a second slide block 900. The fixed guide rail 800 is secured on the first housing 100, a lengthwise direction of the guide rail 800 is parallel to the slide direction of the second housing 200 relative to the first housing 100, and the second slide block 900 is secured on the second housing 200, is sleeved on the fixed guide rail 800, and is slidably connected to the fixed guide rail 800. In this case, as the fixed guide rail 800 is matched with the second slide block 900, the fixed guide rail 800 is secured on the first housing 100, and the second slide block 900 is secured on the second housing 200, the second slide block 900 slides relative to the fixed guide rail 800 in the case that the second housing 200 slides relative to the first housing 100, such that the slide direction of the second housing 200 relative to the first housing 100 is limited by a slide direction of the second slide block 900 relative to the fixed guide rail 800. Thus, the shift phenomenon in the sliding process of the second housing 200 relative to the first housing 100 is avoided.

In the present disclosure, as shown in FIG. 16, the display device further includes a connection plate B1 fixedly connected to the second housing 200. The first drive slideway 203 is disposed on the connection plate B1, and the second slide block 900 is fixedly connected to the connection plate B1, such that the portability of assembling the drive assembly 700, the second slide block 900, and the second housing 200 is improved.

Figure 20:
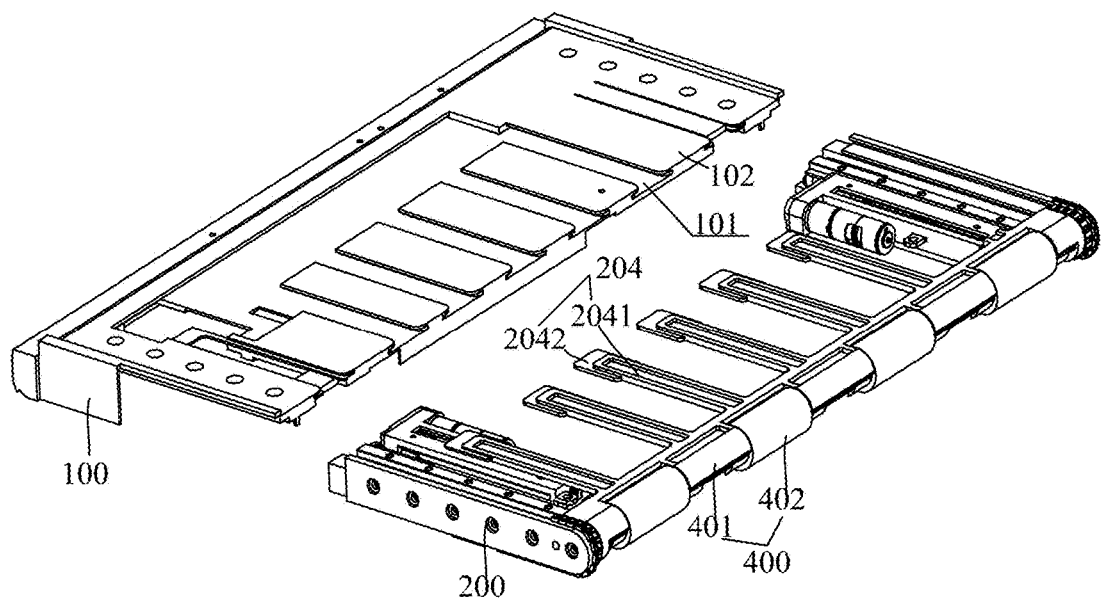
FIG. 20 is an exploded view of a first housing and a second housing according to some embodiments of the present disclosure.
Figure 21:
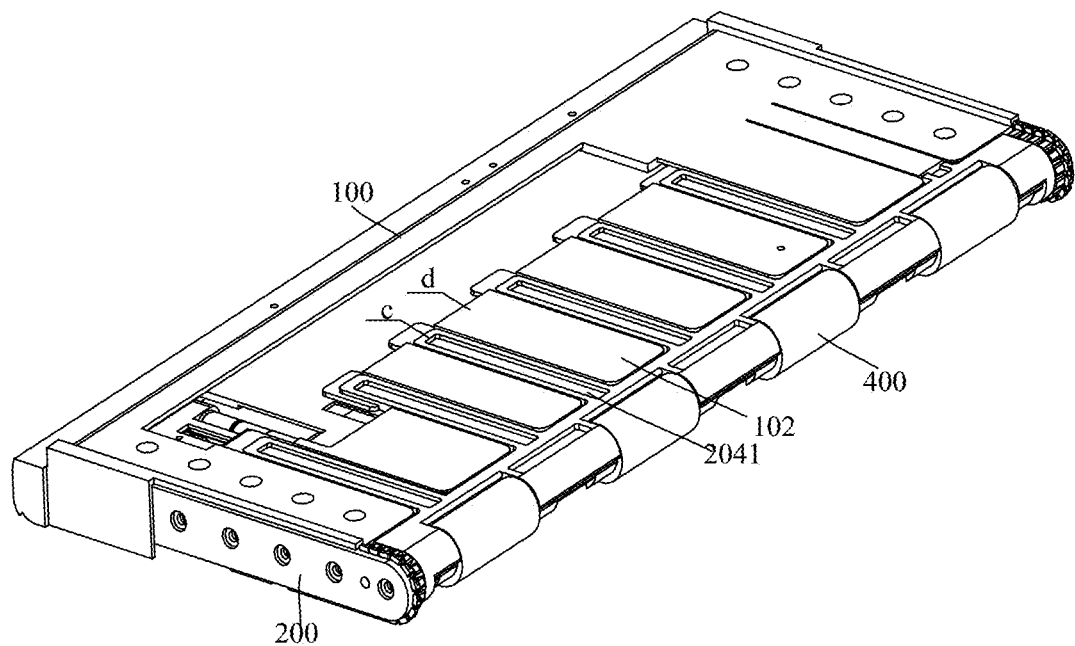
FIG. 21 is a schematic view of connection of the first housing and the second housing shown in FIG. 20.

In some embodiments, referring to FIG. 20 and FIG. 21, FIG. 20 is an exploded view of a first housing and a second housing according to some embodiments of the present disclosure, and FIG. 21 is a schematic view of connection of the first housing and the second housing shown in FIG. 20. The second housing 200 in the display device is provided with a plurality of guide bars 204 arranged in parallel. A lengthwise direction of the plurality of guide bars 204 is perpendicular to an axial direction of the reel 400. In addition, the first housing 100 is provided with a plurality of guide slideways 101 in one-to-one correspondence to the plurality of guide bars 204. At least part of the plurality of guide bars 204 are in the corresponding guide slideways 101 and are slidably connected to the corresponding guide slideways 101. In this case, as the plurality of guide bars 204 are matched with the plurality of guide slideways 101, the flexible display panel 300 is supported in the case that the second housing 200 stably slides relative to the first housing 100.

Figure 22:
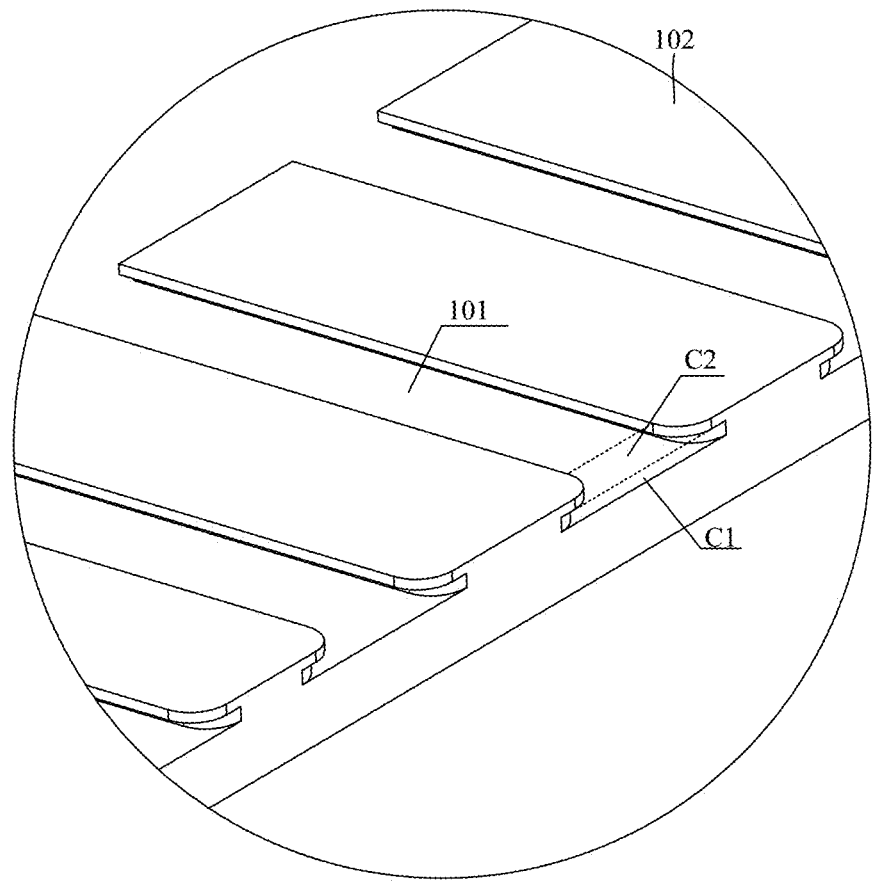
FIG. 22 is a schematic structural view of a dovetail slot according to some embodiments of the present disclosure.

In the embodiments of the present disclosure, as shown in FIG. 20 and FIG. 21, the guide slideway 101 in the first housing 100 is a dovetail slot, and the guide bar 204 in the second housing 200 includes a guide bar body 2041 and a guide slide block 2042 fixedly connected to an end portion of the guide bar body 2041. A shape of the guide slide block 2042 is matched with a shape of the dovetail slot, and at least part of the guide slide block 2042 is in the dovetail slot. In this case, as the guide slideway 101 is disposed as the dovetail slot, and the shape of the guide slide block 2042 in the guide bar 204 is matched with a shape of the dovetail slideway, the guide bar 204 is not prone to departing from the guide slideway 101 in the case that the guide bar 204 slides relative to the guide slideway 101, such that the user experience for the display device is ensured. Illustratively, referring to FIG. 22, FIG. 22 is a schematic structural view of a dovetail slot according to some embodiments of the present disclosure. The dovetail slot includes a first slideway C1 and a second slideway C2 that are connected, and a width of the first slideway C1 is greater than a width of the second slideway C2.

In some embodiments, as shown in FIG. 20 and FIG. 21, the first housing 100 in the display device is further provided with a plurality of guide protrusions 102. An arrangement direction of the plurality of guide protrusions 102 is parallel to an arrangement direction of the plurality of guide bars 204, any two adjacent guide protrusions 102 are configured to define one guide slideway 101, any of the guide bar bodies 2041 is disposed between two adjacent guide protrusions 102, and a face c, proximal to the planar display portion 301 of the flexible display panel 300, of the guide bar body 2041 is flush with faces d, proximal to the planar display portion 301 of the flexible display panel 300, of the two adjacent guide protrusions 102. In this case, as the plurality of guide protrusions 102 are provided, any two adjacent guide protrusions 102 are configured to define one guide slideway 101, and the face, proximal to the planar display portion 301 of the flexible display panel 300, of the guide bar body 2041 is flush with the faces, proximal to the planar display portion 301 of the flexible display panel 300, of the two adjacent guide protrusions 102, the face, proximal to the planar display portion 301 of the flexible display panel 300, of the guide bar body 2041 and the faces, proximal to the planar display portion 301 of the flexible display panel 300, of the guide protrusions 102 both greatly support the flexible display panel 300, and the flatness of the flexible display panel 300 is ensured to be great.

In the embodiments of the present disclosure, as shown in FIG. 20 and FIG. 21, the reel 400 in the display device includes a reel core 401 and at least two reel housings 402. The reel core 401 is fixedly connected to the second housing 200, the at least two reel housings 402 are sleeved on the reel core 401, are rotatably connected to the reel core 401, and are arranged in an axial direction of the reel core 401. In this case, as the reel housing 402 and the reel core 401 are rotatably relative to each other, the flexible display panel 300 and the reel housing 402 are rolled and frictional in the case that the flexible display panel 300 is wound over the reel 400 and slid and rolled, such that the convenience of sliding and rolling of the flexible display panel 300 is ensured. Illustratively, two, three, or four reel housings 402 are defined, which is not limited in the embodiments of the present disclosure.

Figure 23:
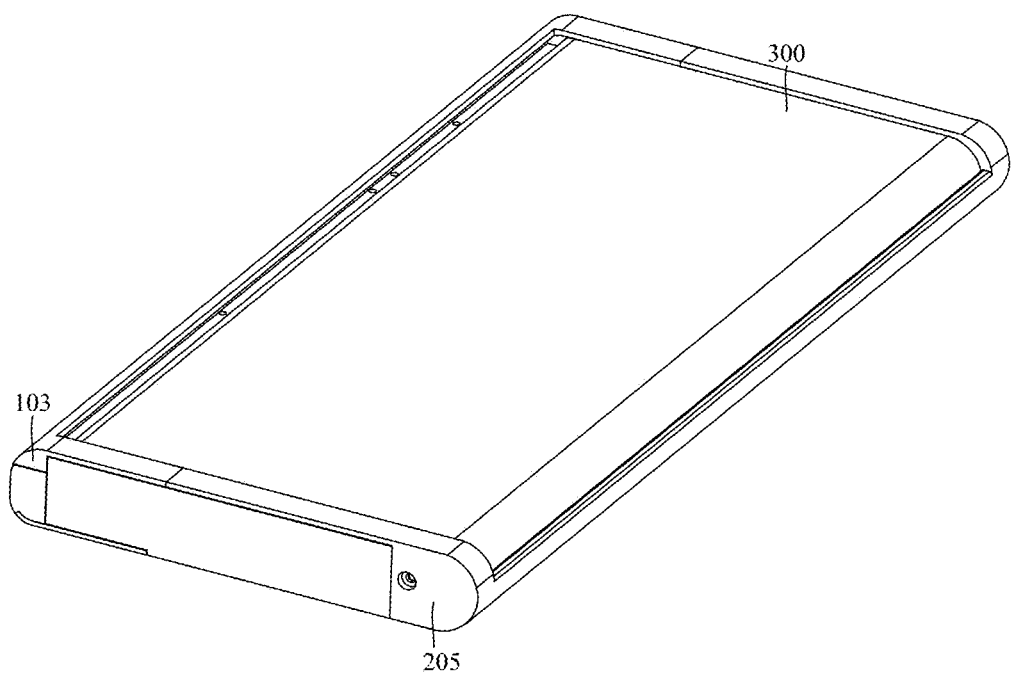
FIG. 23 is a schematic view of an outside structure of a display device according to some embodiments of the present disclosure.

In some embodiments, referring to FIG. 23, FIG. 23 is a schematic view of an outside structure of a display device according to some embodiments of the present disclosure. The first housing 100 is further provided with a first decoration housing 103, and the second housing 200 is further provided with a second decoration housing 205. The first decoration housing 103 is disposed on an outer edge portion of the first housing 100, and the second decoration housing 205 is disposed on an outer edge portion of the second housing 200, such that partial assemblies of the display device are wrapped by the two decoration housings, and the appearance of the display device is greatly decorated.

In summary, a display device is provided in the embodiments of the present disclosure. The display device includes a first housing, at least one second housing, a flexible display panel, a reel, and a plurality of support columns. As the plurality of support columns are disposed on a rear face of the rollable display portion of the flexible display panel, and two ends of the plurality of support columns are slidably connected to the second housing, such that the plurality of support columns efficiently support the flexible display panel, the flexibility of the flexible display panel in a Y axis direction is limited based on matching of the second housing, and a risk of an uneven phenomenon in the flexible display panel is efficiently reduced. Thus, a flatness of the flexible display panel is great, and a display effect of the display device is further great.

In the present disclosure, the terms "first" and "second" are only used for the purpose of description and should not be construed as indicating or implying relative importance. Unless otherwise clearly defined, the expression "a plurality of" refers to two or more.

Described above are merely exemplary embodiments of the present disclosure, and are not intended to limit the present disclosure. Any modifications, equivalent replacements, improvements and the like made within the spirit and principles of the present disclosure should be encompassed within the scope of protection of the present disclosure.

The invention claimed is:

1. A display device, comprising:
a first housing and at least one second housing, wherein the at least one second housing is slidably connected to the first housing;
a flexible display panel comprising a planar display portion and a rollable display portion, wherein the planar display portion is secured on the first housing;
a reel disposed in the at least one second housing and connected to the at least one second housing, wherein the rollable display portion comprises a first portion wound over the reel and a second portion parallel to the planar display portion; and
a plurality of support columns arranged in an array, wherein two ends of each of the plurality of support columns are slidably connected to the at least one second housing, the plurality of support columns are fixedly connected to a rear face of the rollable display portion, and at least some of the plurality of support columns are in contact with the reel corresponding to the first portion in a slide direction of the at least one second housing relative to the first housing,
wherein the at least one second housing comprises a support housing and two limit members respectively and fixedly connected to two ends of the support housing, wherein a slideway is defined in sides, facing towards the plurality of support columns, of the two limit members; and the flexible display panel further comprises a non-display portion on a side, facing away from the planar display portion, of the rollable display portion, and the display device further comprises a support plate, wherein the support plate is fixedly connected to a rear face of the non-display portion, and two ends of the support plate are slidably connected to the slideway; and
the display device further comprises a fixed guide rail and a second slide block, wherein the fixed guide rail is secured on the first housing, a lengthwise direction of the guide rail is parallel to the slide direction of the at least one second housing relative to the first housing, and the second slide block is secured on the at least one second housing, sleeved on the fixed guide rail and slidably connected to the fixed guide rail.

2. The display device according to claim 1, wherein in sliding of the at least one second housing relative to the first housing, at least one of the plurality of support columns is in contact with the reel corresponding to the first portion in the slide direction of the at least one second housing relative to the first housing.

3. The display device according to claim 1, wherein the plurality of support columns are equally spaced apart on the rear face of the rollable display portion.

4. The display device according to claim 1, wherein the two ends of the each of the plurality of support columns are provided with first slide protrusions, wherein the plurality of support columns are disposed between the two limit members, and at least part of the first slide protrusions are disposed in the slideway.

5. The display device according to claim 4, wherein the slideway comprises a first planar slideway and a second planar slideway that are opposite, and a curved slideway in communication with both the first planar slideway and the second planar slideway, wherein the curved slideway is disposed in the side, facing away from the first housing, of the reel.

6. The display device according to claim 4, wherein the two ends of the each of the plurality of support columns are further provided with first limit protrusions adjacent to the first slide protrusions, wherein the first limit protrusions are outside the slideway, and a portion, connected to the support column, of the rollable display portion is disposed between two of the first limit protrusions in the each of the plurality of support columns.

7. The display device according to claim 6, wherein the first limit protrusions are provided with protrusion portions and recess portions that are opposite, wherein in two adjacent first limit protrusions, at least part of the protrusion portion of one of the two adjacent first limit protrusions is in the recess portion of the other of the two adjacent first limit protrusions.

8. The display device according to claim 1, wherein the two ends of the support plate are both provided with second slide protrusions and second limit protrusions, wherein at least part of the second slide protrusions are in the slideway, the second limit protrusions are outside the slideway, and a portion, connected to the support plate, of the non-display portion is disposed between two of the second limit protrusions in the support plate.

9. The display device according to claim 8, wherein faces, facing away from the plurality of support columns, of the first limit protrusions are flush with faces, facing away from the support plate, of the second limit protrusions.

10. The display device according to claim 1, further comprising: a drive assembly connected to the first housing and the at least one second housing, wherein the drive assembly is configured to drive the at least one second housing to slide relative to the first housing.

11. The display device according to claim 10, wherein the drive assembly comprises a drive motor, a screw, and a first slide block, wherein the drive motor is secured on the first housing and connected to an end of the screw, and the first slide block is sleeved on the screw, connected to the at least one second housing and configured to move in a lengthwise direction of the screw in rotation of the screw driven by the drive motor to drive the at least one second housing to slide relative to the first housing.

12. The display device according to claim 11, wherein in the case that the display device comprises a support plate, the at least one second housing comprises a strip-shaped first drive slideway, and a second drive slideway is defined in a side, proximal to the at least one second housing, of the support plate; wherein
- a lengthwise direction of the first drive slideway and a lengthwise direction of the second drive slideway are both perpendicular to an axial direction of the reel;
- an end, proximal to the reel, of the first drive slideway is a first baffle end, and an end, facing away from the reel, of the second drive slideway is a second baffle end; and
- the first slide block is provided with a rod extending in the first drive slideway and the second drive slideway, wherein the rod is configured to drive the at least one second housing to slide in a direction facing away from the first housing upon contact with the first baffle end, and drive the at least one second housing to slide in a direction approaching the first housing through the support plate upon contact with the second baffle end.

13. The display device according to claim 12, wherein a first opening is defined in an end, facing away from the reel, of the first drive slideway, and a second opening is defined in an end, close to the reel, of the second drive slideway.

14. The display device according to claim 1, wherein
the at least one second housing is provided with a plurality of guide bars arranged in parallel, wherein a lengthwise direction of the plurality of guide bars is perpendicular to an axial direction of the reel; and
the first housing is provided with a plurality of guide slideways in one-to-one correspondence to the plurality of guide bars, wherein at least part of the plurality of guide bars are in the corresponding guide slideway and slidably connected to the corresponding guide slideway.

15. The display device according to claim 14, wherein the plurality of guide slideways are dovetail slots, and the plurality of guide bars comprise guide bar bodies and guide slide blocks fixedly connected to end portions of the guide bar bodies, wherein shapes of the guide slide blocks are matched with shapes of the dovetail slots, and at least part of the guide slide blocks are in the dovetail slots.

16. The display device according to claim 15, wherein the first housing is further provided with a plurality of guide protrusions, wherein an arrangement direction of the plurality of guide protrusions is parallel to an arrangement direction of the plurality of guide bars, any two adjacent guide protrusions are configured to define one guide slideway, any of the guide bar bodies is disposed between two adjacent guide protrusions, and a face, proximal to the planar display portion, of the any of the guide bar bodies is flush with faces, proximal to the planar display portion, of the two adjacent guide protrusions.

17. The display device according to claim 1, wherein the reel comprises a reel core and at least two reel housings, wherein the reel core is fixedly connected to the at least one second housing, and the at least two reel housings are sleeved on the reel core, rotatably connected to the reel core and arranged in an axial direction of the reel core.

18. The display device according to claim 1, wherein
one second housing is defined in the display device, wherein the second housing is disposed on any of two opposite sides of the first housing upon unrolling of the flexible display panel; or
two second housings are defined in the display device, wherein the two second housings are respectively disposed on two opposite sides of the first housing upon unrolling of the flexible display panel.

* * * * *